(12) United States Patent
Nakamura et al.

(10) Patent No.: US 10,534,457 B2
(45) Date of Patent: Jan. 14, 2020

(54) TOUCH PANEL AND METHOD FOR MANUFACTURING TOUCH PANEL

(71) Applicant: Semiconductor Energy Laboratory Co., Ltd., Atsugi-shi, Kanagawa-ken (JP)

(72) Inventors: Daiki Nakamura, Atsugi (JP); Masataka Ikeda, Shinjuku (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/988,562

(22) Filed: May 24, 2018

(65) Prior Publication Data

US 2018/0275785 A1 Sep. 27, 2018

Related U.S. Application Data

(63) Continuation of application No. 14/553,308, filed on Nov. 25, 2014, now Pat. No. 9,983,702.

(30) Foreign Application Priority Data

Dec. 2, 2013 (JP) .................... 2013-249280
May 21, 2014 (JP) .................... 2014-104981

(51) Int. Cl.
G06F 3/041 (2006.01)
G02F 1/1333 (2006.01)

(52) U.S. Cl.
CPC .......... *G06F 3/041* (2013.01); *G02F 1/13338* (2013.01); *G06F 2203/04103* (2013.01); *Y10T 29/49002* (2015.01)

(58) Field of Classification Search
CPC .......... G06F 3/041; G06F 2203/04103; G02F 1/13338; Y10T 29/49002
See application file for complete search history.

(56) References Cited

U.S. PATENT DOCUMENTS 6,035,180 A 3/2000 Kubes et al.
8,350,451 B2 1/2013 Bright et al.
(Continued)

FOREIGN PATENT DOCUMENTS

CN 102566111 A 7/2012
CN 104067352 A 9/2014
(Continued)

OTHER PUBLICATIONS

Chinese Office Action (Application No. 201480065778.9) dated May 31, 2018.
(Continued)

*Primary Examiner* — Kenneth Bukowski
(74) *Attorney, Agent, or Firm* — Robinson Intellectual Property Law Office; Eric J. Robinson

(57) ABSTRACT

A touch panel capable of performing display and sensing along a curved surface or a touch panel that maintains high detection sensitivity even when it is curved along a curved surface is provided. A flexible display panel is placed along a curved portion included in a surface of a support. A first film layer is attached along a surface of the display panel by a bonding layer. Second to n-th film layers (n is an integer of 2 or more) are sequentially attached along a surface of the first film layer by bonding layers. A flexible touch sensor is attached along a surface of the n-th film layer by a bonding layer.

15 Claims, 23 Drawing Sheets

(56) References Cited

U.S. PATENT DOCUMENTS

| | | |
|---|---|---|
| 8,415,208 B2 | 4/2013 | Takayama et al. |
| 8,736,162 B2 | 5/2014 | Jin et al. |
| 9,448,592 B2 | 9/2016 | Jin et al. |
| 10,054,988 B2 | 8/2018 | Jin et al. |
| 2010/0253902 A1 | 10/2010 | Yamazaki et al. |
| 2011/0273383 A1 | 11/2011 | Jeon et al. |
| 2012/0159780 A1 | 6/2012 | Chan et al. |
| 2012/0162108 A1 | 6/2012 | Chan et al. |
| 2013/0002133 A1 | 1/2013 | Jin et al. |
| 2013/0016047 A1 | 1/2013 | Masumoto |
| 2013/0186925 A1 | 7/2013 | West |
| 2013/0285039 A1 | 10/2013 | Ishihara et al. |
| 2014/0028569 A1 | 1/2014 | Guard et al. |
| 2014/0099999 A1 | 4/2014 | Hatano et al. |
| 2014/0306260 A1 | 10/2014 | Yamazaki et al. |
| 2014/0319550 A1 | 10/2014 | Yamazaki et al. |
| 2015/0036066 A1 | 2/2015 | Chan et al. |
| 2015/0103023 A1 | 4/2015 | Iwaki |
| 2015/0108439 A1* | 4/2015 | Kim .................. H01L 51/5256 257/40 |
| 2015/0153861 A1 | 6/2015 | Yamazaki et al. |
| 2018/0011351 A1 | 1/2018 | Yamazaki et al. |

FOREIGN PATENT DOCUMENTS

| | | | |
|---|---|---|---|
| EP | 2469327 A | | 6/2012 |
| EP | 2469328 A | | 6/2012 |
| JP | 09-016330 A | | 1/1997 |
| JP | 2000-180836 A | | 6/2000 |
| JP | 2001-292276 A | | 10/2001 |
| JP | 2001-519585 | | 10/2001 |
| JP | 2002-033823 A | | 1/2002 |
| JP | 2003-174153 A | | 6/2003 |
| JP | 2005-018551 A | | 1/2005 |
| JP | 2007-183706 A | | 7/2007 |
| JP | 2010-156784 A | | 7/2010 |
| JP | 2010-262275 A | | 11/2010 |
| JP | 2010-267607 A | | 11/2010 |
| JP | 2011-525042 | | 9/2011 |
| JP | 2012-068760 A | | 4/2012 |
| JP | 2012-133428 A | | 7/2012 |
| JP | 2012-133779 A | | 7/2012 |
| JP | 2013-015835 A | | 1/2013 |
| JP | 2013-025626 A | | 2/2013 |
| JP | 5397824 | | 1/2014 |
| KR | 2014-0093765 A | | 7/2014 |
| TW | 522275 | | 3/2003 |
| TW | 201005330 | | 2/2010 |
| TW | 201227468 | | 7/2012 |
| TW | 22313-1450 | | 1/2013 |
| TW | 201346675 | | 11/2013 |
| WO | WO-1999/018590 | | 4/1999 |
| WO | WO-2009/149032 | | 12/2009 |
| WO | WO-2013/114945 | | 8/2013 |

OTHER PUBLICATIONS

International Search Report (Application No. PCT/IB2014/066221) dated Mar. 10, 2015.
Written Opinion (Application No. PCT/IB2014/066221) dated Mar. 10, 2015.
Taiwanese Office Action (Application No. 103141195) dated Jun. 20, 2018.
Taiwanese Office Action (Application No. 108126028) dated Oct. 23, 2019.

* cited by examiner

FIG. 1A1
FIG. 1A2
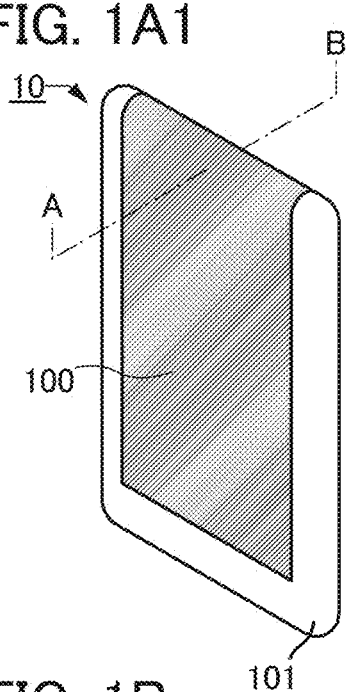
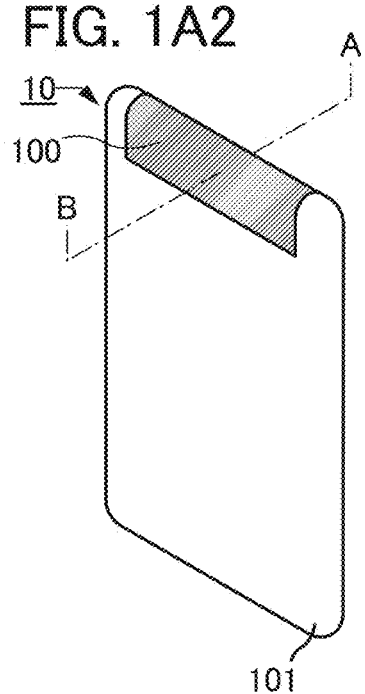
FIG. 1B
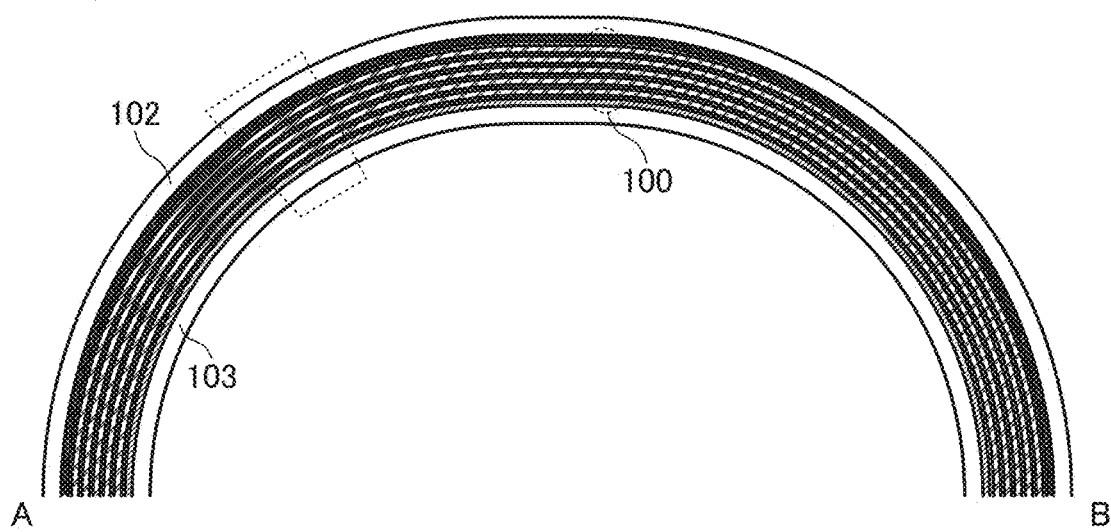
FIG. 1C
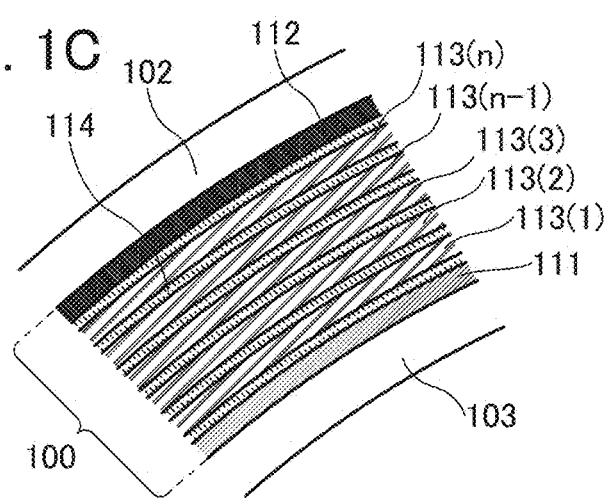

FIG. 4A1
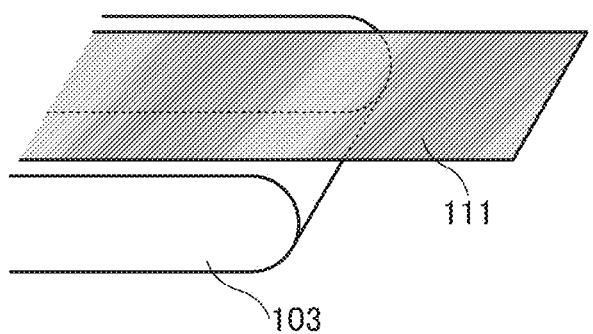
FIG. 4A2
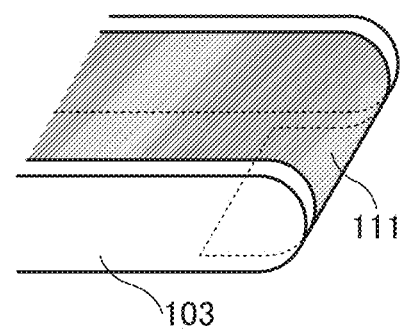
FIG. 4B1
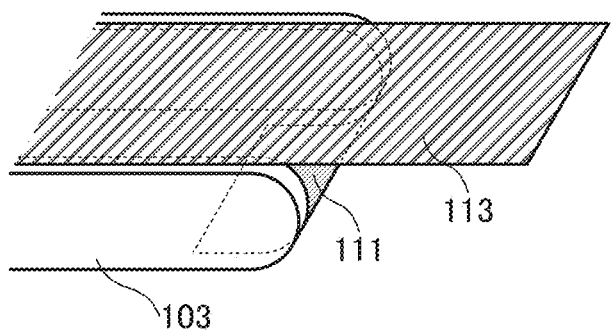
FIG. 4B2
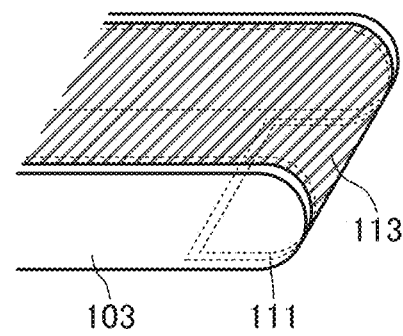
FIG. 4C1
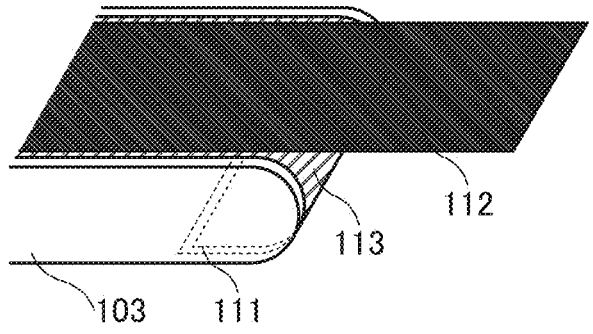
FIG. 4C2
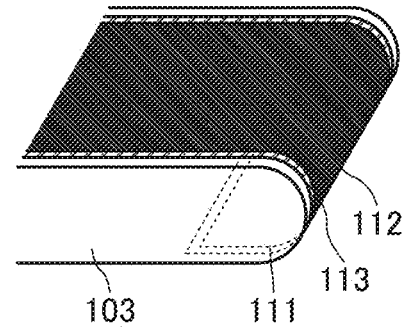
FIG. 4D
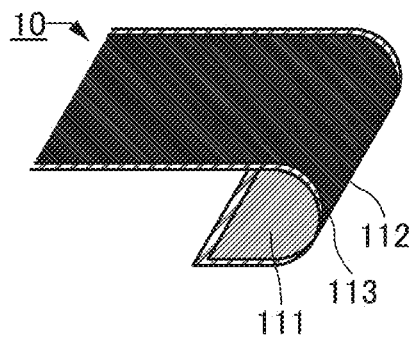

FIG. 5A1 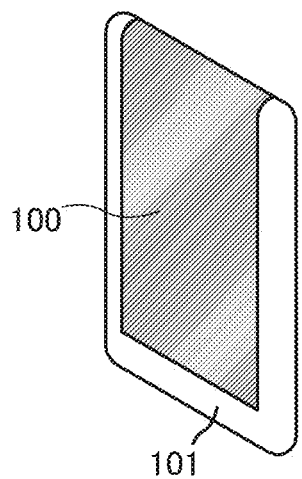
FIG. 5A2 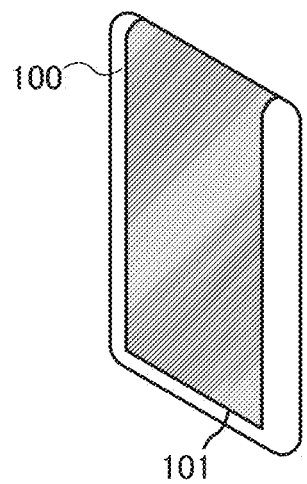
FIG. 5B1 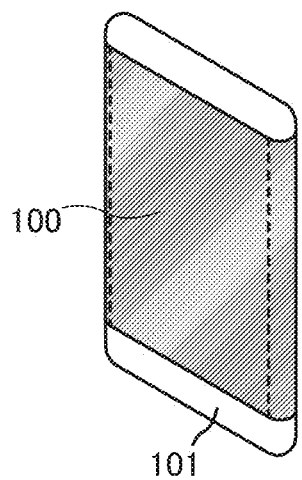
FIG. 5B2 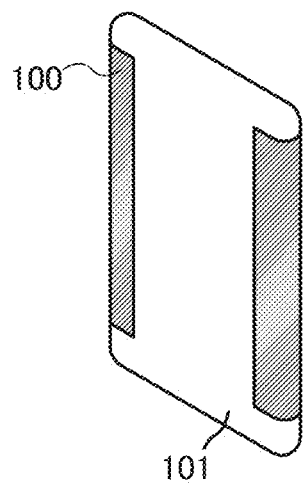
FIG. 5C1 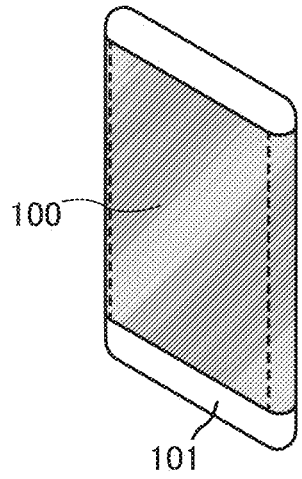
FIG. 5C2 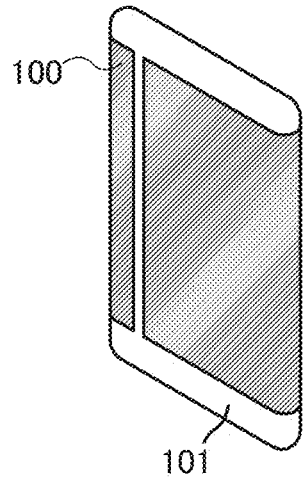

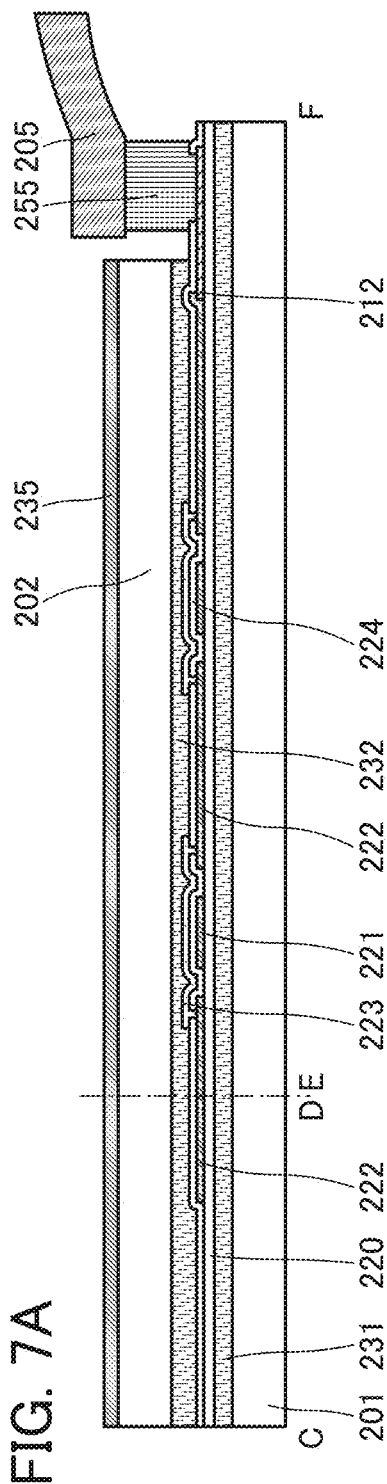
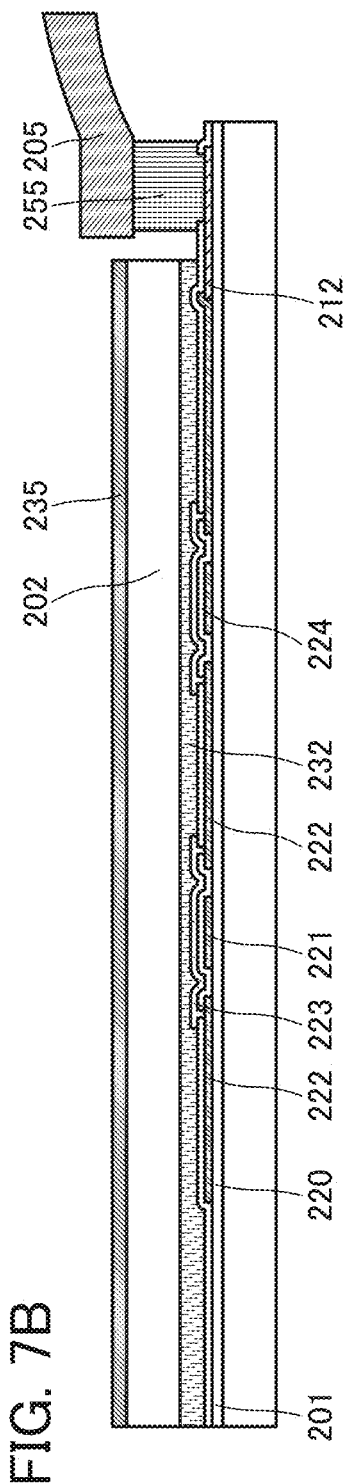
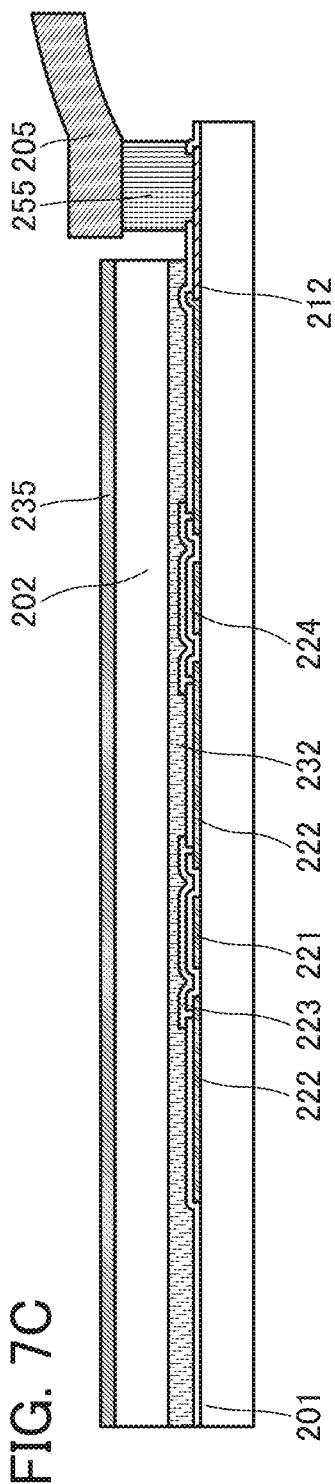

Circuit B

TOUCH PANEL AND METHOD FOR MANUFACTURING TOUCH PANEL

TECHNICAL FIELD

One embodiment of the present invention relates to a display device, and particularly to a flexible display device capable of performing display along a curved surface. One embodiment of the present invention also relates to a touch panel, and particularly to a flexible touch panel capable of being placed along a curved surface. Furthermore, one embodiment of the present invention relates to an electronic device having a display portion.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

Recent display devices are expected to be applied to a variety of uses and become diversified. For example, a smartphone and a tablet with a touch panel are being developed as portable information appliances.

Patent Document 1 discloses a flexible active matrix light-emitting device in which an organic EL element and a transistor serving as a switching element are provided over a film substrate.

REFERENCE

Patent Document 1: Japanese Published Patent Application No. 2003-174153

DISCLOSURE OF INVENTION

It is expected that placing a touch panel along a curved surface of a housing in an electronic device will provide an unprecedented function and application for the electronic device. For this reason, what is desirable is a touch panel in which a display device thinned to have flexibility is provided with a function of inputting data with a finger or the like touching a screen as a user interface.

An object of one embodiment of the present invention is to provide a touch panel capable of performing display and sensing along a curved surface. Another object of one embodiment of the present invention is to provide a touch panel that maintains high detection sensitivity even when it is curved along a curved surface. Another object of one embodiment of the present invention is to provide an electronic device capable of performing display and sensing along a curved surface. Another object of one embodiment of the present invention is to provide an electronic device in which the detection sensitivity of a touch panel is high even in a curved portion.

Another object of one embodiment of the present invention is to provide a novel display device, a novel touch sensor, a novel touch panel, or a novel electronic device.

Note that the description of these objects does not disturb the existence of other objects. In one embodiment of the present invention, there is no need to achieve all the objects. Objects other than the above objects will be apparent from and can be derived from the description of the specification and the like.

One embodiment of the present invention is a method for manufacturing a touch panel, including the following steps: placing a flexible display panel along a curved portion included in a surface of a support; attaching a film layer along a surface of the display panel by a bonding layer; and attaching a flexible touch sensor along a surface of the film layer by a bonding layer.

Another embodiment of the present invention is a method for manufacturing a touch panel, including the following steps: placing a flexible display panel along a curved portion included in a surface of a support; attaching a first film layer along a surface of the display panel by a bonding layer; sequentially attaching second to n-th film layers (n is an integer of 2 or more) along a surface of the first film layer by bonding layers; and attaching a flexible touch sensor along a surface of the n-th film layer by a bonding layer.

The method preferably includes a step of sequentially attaching (n+1)th to m-th film layers (m is an integer of n+1 or more) along a surface of the touch sensor after the step of attaching the touch sensor.

Another embodiment of the present invention is a touch panel including a display panel, first to n-th film layers (n is an integer of 2 or more), and a touch sensor that are sequentially stacked. A surface of the touch panel is a curved surface maintained even when the touch panel is not supported by a support.

In the touch panel, it is preferred that the display panel have a thickness of 1 μm to 300 μm, that the touch sensor have a thickness of 1 μm to 300 μm, and that each of the first to n-th film layers have a thickness of 1 μm to 300 μm.

In the touch panel, it is preferred that any adjacent two of the display panel, the first to n-th film layers, and the touch sensor be attached to each other by a bonding layer, and that the bonding layer have a thickness of 300 nm to 300 μm.

One embodiment of the present invention can provide a touch panel capable of performing display and sensing along a curved surface. Another embodiment of the present invention can provide a touch panel whose detection sensitivity is high even when it is curved along a curved surface.

Another embodiment of the present invention can provide a novel display device (display panel), touch sensor, or touch panel. Note that the description of these effects does not disturb the existence of other effects. One embodiment of the present invention does not necessarily achieve all the effects. Other effects will be apparent from and can be derived from the description of the specification, the drawings, the claims, and the like.

BRIEF DESCRIPTION OF DRAWINGS

In the accompanying drawings:

FIGS. 1A1 and 1A2 illustrate a structure example of an electronic device, and

FIGS. 1B and 1C illustrate a structure example of a touch panel;

FIGS. 4A1, 4A2, 4B1, 4B2, 4C1, 4C2, and 4D illustrate an example of a method for manufacturing a touch panel;

FIGS. 5A1, 5A2, 5B1, 5B2, 5C1, and 5C2 illustrate structure examples of an electronic device;

FIGS. 7A to 7C illustrate structure examples of a touch sensor;

BEST MODE FOR CARRYING OUT THE INVENTION

Figure 2A:
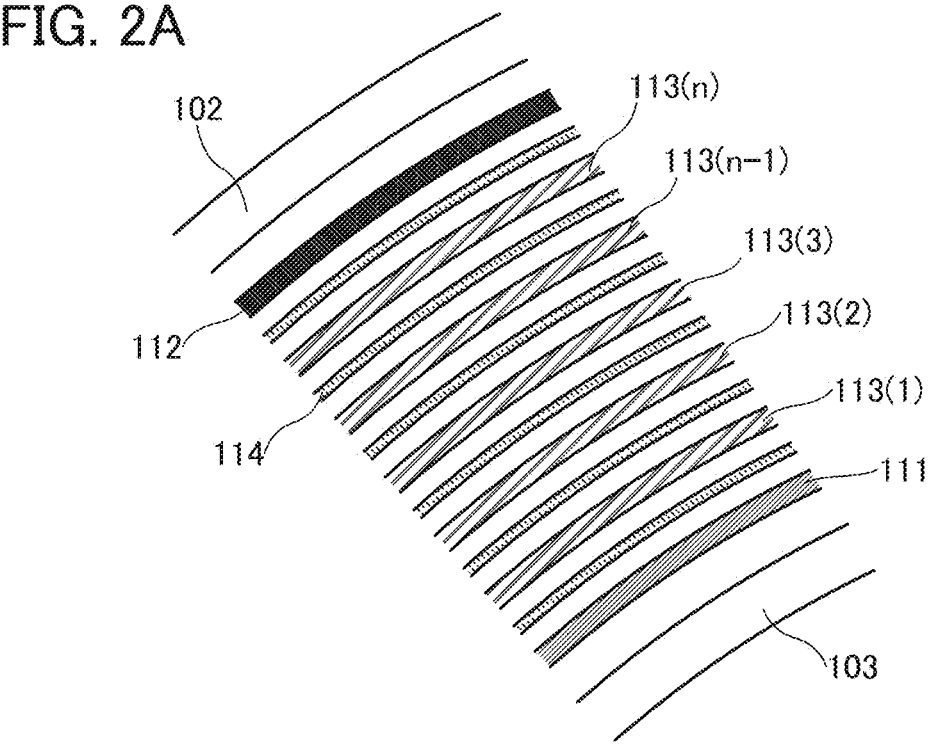
FIGS. 2A and 2B illustrate structure examples of a touch panel.

Embodiments will be described in detail with reference to the drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. In some cases, the same hatching pattern is used for portions having similar functions, and the portions are not denoted by reference numerals.

Note that in each drawing described in this specification, the size, the layer thickness, or the region of each component is exaggerated for clarity in some cases; therefore, embodiments of the present invention are not limited to such a scale.

Note that in this specification and the like, ordinal numbers such as first and second are used in order to avoid confusion among components and do not limit the number.

Embodiment 1

In this embodiment, a touch panel of one embodiment of the present invention and examples of electronic devices having the touch panel will be described with reference to drawings.

Structure Example

FIGS. 1A1 and 1A2 are schematic perspective diagrams of an electronic device 10. FIG. 1A1 illustrates the front surface, right side surface, and top surface of the electronic device 10. FIG. 1A2 illustrates the back surface, left side surface, and top surface of the electronic device 10. Note that the side A and the side B of the line A-B in FIGS. 1A1 and 1A2 are the front side and the back side of the electronic device 10, respectively.

The electronic device 10 is provided with a touch panel 100 capable of display on a surface of a housing 101. The touch panel 100 is positioned along surfaces of parts of regions in the top, front, and back surfaces of the housing 101 among six faces of the top, back, front, bottom, right side, and left side surfaces. In the housing 101, at least the surfaces where the touch panel 100 is positioned have curved portions.

FIG. 1B is a schematic cross-sectional diagram along the line A-B in FIGS. 1A1 and 1A2. A region including the surface with a curved portion of the housing 101 is cut along the line A-B.

The touch panel 100 is provided along a surface of a support 103. The surface of the support 103 has a curved portion. A light-transmitting exterior component 102 is provided to cover the touch panel 100. The light-transmitting exterior component 102 is preferably used at least in a region of the housing 101 that overlaps with a display portion of the touch panel 100. The support 103 and the exterior component 102 may be part of the housing 101.

The curved portion of the surface of the support 103 is preferably a surface that can be made by transforming a plane without stretching or compressing (i.e., a developable surface).

The support 103 has a function of maintaining the shape of the touch panel 100. For the support 103, a material with higher stiffness than at least the touch panel 100 (e.g., resin, glass, or metal) can be used.

As the support 103, it is possible to use a support for determining the shape of the touch panel 100 in an example of manufacturing steps of the touch panel 100 that is described later. Note that the support 103 is not necessarily provided when it is not required in the housing 101, or the support 103 may be part of the housing 101.

For the exterior component 102, a light-transmitting material (e.g., glass or an organic material such as acrylic) can be used. Since a surface of the exterior component 102 serves as a touch surface, the exterior component 102 is preferably an insulator. A high dielectric constant material is preferably used for the exterior component 102, in which case the detection sensitivity of the touch panel 100 can be increased.

When a surface of the touch panel 100 functions as a touch surface, it is possible that the exterior component 102 is not provided and the surface of the touch panel 100 is exposed. In this case, the surface of the touch panel 100 is preferably coated with a material having high hardness.

FIG. 1C is an enlarged schematic cross-sectional diagram of a region surrounded by dashed lines in FIG. 1B. FIG. 2A is a schematic diagram showing that the components illustrated in FIG. 1C are separated from each other.

The touch panel 100 includes a display panel 111, a touch sensor 112, and a plurality of film layers 113. The display panel 111 and the touch sensor 112 are stacked so that the display panel 111 is placed on the support 103 side and the touch sensor 112 is placed on the exterior component 102 side. Furthermore, n film layers 113 (n is an integer of 2 or more) are sandwiched between the display panel 111 and the touch sensor 112. Here, among the film layers sandwiched between the display panel 111 and the touch sensor 112, the film layer nearest to the display panel 111 is referred to as a film layer 113(1), the film layer next nearest to the display panel 111 is referred to as a film layer 113(2), and the film layer nearest to the touch sensor 112 is referred to as a film layer 113(n). In the following description, the term "film layer 113" is used when the film layers are not distinguished from each other.

Two film layers 113 are preferably bonded to each other with a bonding layer 114 as shown in FIG. 1C and the like. Similarly, bonding of the film layer 113(1) and the display panel 111 as well as bonding of the film layer 113(n) and the touch sensor 112 is preferably performed with bonding layers 114.

The display panel 111 is flexible and is provided along the surface of the support 103. The film layer 113(1) is provided along a surface of the display panel 111. The film layer 113(2) is provided along a surface of the film layer 113(1). Similarly, the film layer 113(n) is provided along a surface of the film layer 113(n−1). The touch sensor 112 is provided along a surface of the film layer 113(n).

The plurality of film layers 113 sandwiched between the display panel 111 and the touch sensor 112 in such a manner can increase the distance between the display panel 111 and the touch sensor 112, thereby decreasing parasitic capacitance between a wiring or an electrode included in the display panel 111 and that included in the touch sensor 112. This prevents the detection sensitivity of the touch sensor 112 from being decreased by adverse effects on the touch sensor 112 of noise that occurs when the display panel 111 is driven.

As compared to the case where a spacer, which is a single component, is sandwiched between the display panel 111 and the touch sensor 112 to increase the distance therebetween, the use of the plurality of film layers 113 makes noise from the display panel 111 likely to be scattered between the film layers 113, resulting in a reduction in the effect of noise on the touch sensor 112 in some cases.

The thickness of the display panel 111 ranges preferably from 1 µm to 300 µm, for example, more preferably from 3 µm to 200 µm, still more preferably from 5 µm to 100 µm. Typically, the thickness of the display panel 111 is preferably approximately 50 µm.

The thickness of the touch sensor 112 ranges preferably from 1 µm to 300 µm, more preferably from 3 µm to 200 µm, still more preferably from 5 µm to 100 µm. Typically, the thickness of the touch sensor 112 is preferably approximately 50 µm.

If the display panel 111 or the touch sensor 112 has a thickness of less than 1 µm, insufficient mechanical strength of the display panel 111 or the touch sensor 112 contributes to damage. On the other hand, if the display panel 111 or the touch sensor 112 has a thickness of more than 500 µm, the flexibility decreases and stress applied to the display panel 111 or the touch sensor 112 increases because the difference between the inner diameter and outer diameter of the curved portion increases. Thus, a substrate included in the display panel 111 or the touch sensor 112 or a wiring, an element, or the like provided over the substrate might be damaged.

The thickness of the film layer 113 can be set as appropriate in accordance with the number of layers to be stacked, the radius of curvature of a curved surface, or the like. Specifically, the thickness of the film layer 113 is 300 µm or less, preferably 250 µm or less, more preferably 200 µm or less, still more preferably 150 µm or less, yet still more preferably 100 µm, even yet still more preferably 50 µm and is 1 µm or more, preferably 5 µm or more, more preferably 10 µm or more, still more preferably 20 µm or more. As the film layer 113 is thinner, the film layer 113 can be more easily provided along a curved surface with a smaller radius of curvature; however, the number of stacked layers increases to increase the distance between the display panel 111 and the touch sensor 112, which might result in a complicated fabrication process. If the film layer 113 has a thickness of more than 500 µm, a wrinkle, a crack, or the like might occur on the surface of the film layer 113 depending on the radius of curvature of the curved surface of the support 103.

The thickness of the bonding layer 114 is 300 µm or less, preferably 200 µm or less, more preferably 100 µm or less, still more preferably 50 µm or less and is 300 nm or more, preferably 1 µm or more, more preferably 5 µm or more, still more preferably 10 µm or more.

For the film layer 113 and the bonding layer 114, a low dielectric constant material is preferably used. The film layer 113 formed using a low dielectric constant material can reduce the number of stacked film layers 113 as well as parasitic capacitance between the touch sensor 112 and the display panel 111. For example, the film layer 113 and the bonding layer 114 are preferably formed using a material with a dielectric constant in the range of 2.0 to 10.0, preferably 2.0 to 5.0, more preferably 2.0 to 4.5, still more preferably 2.0 to 4.0.

The material used for the film layer 113 and the bonding layer 114 preferably has high visible light transmittance. It is preferable to use a material with transmittance of visible light (e.g., light in the wavelength range of 400 nm to 700 nm) of 70% or more, preferably 80% or more, more preferably 85% or more, still more preferably 90% or more.

For the film layer 113, an insulating material with a light-transmitting property, for example, an organic insulating material or an inorganic insulating material can be used. Moreover, a material used for the film layer 113 may be in a sheet form, have viscosity, or be obtained by drying and solidifying a viscous material. Furthermore, the film layer 113 may have a stacked-layer structure using at least two organic insulating materials, at least two inorganic insulating materials, or a combination of an organic insulating material and an inorganic insulating material.

Examples of a material used for the film layer 113 include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, it is preferable to use a material with a low thermal expansion coefficient, for example, a polyamide imide resin, a polyimide resin, or PET, which has a thermal expansion coefficient of $30\times10^{-6}$/K or lower. It is also possible to use a substrate in which a fibrous body is impregnated with a resin (also referred to as prepreg) or a substrate whose thermal expansion coefficient is reduced by mixing an inorganic filler with an organic resin.

In the case where a fibrous body is included in the above material, a high-strength fiber of an organic compound or an inorganic compound is used as the fibrous body. The high-strength fiber is specifically a fiber with a high tensile modulus of elasticity or a fiber with a high Young's modulus. Typical examples include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as a flexible substrate. The structure body including the fibrous body and the resin is preferably used as a flexible substrate, in which case the reliability against bending and damage due to local pressure can be increased.

For the bonding layer 114, a viscous material or a curable resin such as a heat curable resin, a photocurable resin, or a two-component curable resin can be used. For instance, an acrylic resin, a urethane resin, an epoxy resin, a silicone resin, or a resin having a siloxane bond can be used.

When the film layer 113 is formed using a viscous material, a material for the bonding layer 114 can be used, in which case the bonding layer 114 can be omitted.

When the film layer 113 is thinner, the radius of curvature of the curved surface of the support 103 can be reduced as described above. When the radius of curvature is large, a relatively thick film layer 113 can be used.

Here, when the thickness of the film layer 113 is T and the smallest radius of curvature of the support 103 is R, the thickness of the film layer 113 can be set so that T/R is, for example, 0.2 or less, preferably 0.1 or less, more preferably 0.05 or less. For example, T/R is 0.025 when the curvature radius R is 4 mm and the thickness T of the film layer 113 is 100 µm.

In reality, the radius of curvature of the curved film layer 113 increases according to the thicknesses of the display panel 111 and the bonding layer 114; thus, the allowable thickness of the film layer 113 can be larger than the aforementioned upper limit. The film layer 113(1), which is placed nearest to the display panel 111, has the smallest allowable thickness.

The plurality of film layers 113 are preferably films of the same material and with the same thickness for lower fabrication cost. Alternatively, the film layers 113 closer to the touch sensor 112 may be thicker.

Figure 2B:
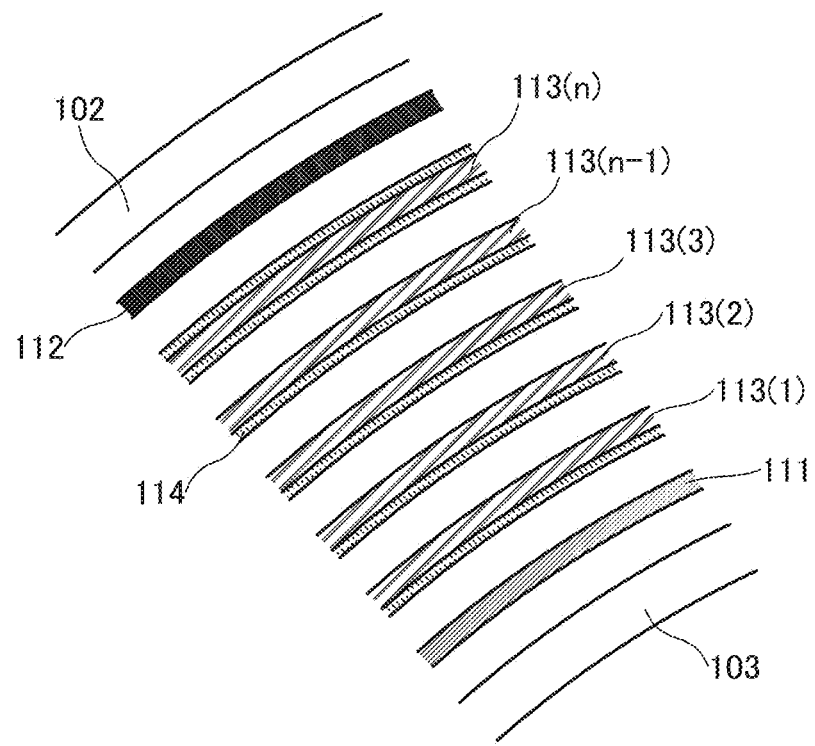

As illustrated in FIG. 2B, a material combining the film layer 113 and the bonding layer 114 may be used. For example, an adhesive film in which an adhesive bonding layer 114 is provided on at least one surface of the film layer 113 may be used. In this case, the film layer 113(n) closest to the touch sensor 112 or the film layer 113(1) closest to the display panel 111 is preferably a film in which the bonding layer 114 is provided on opposite sides of the film layer 113 so that it can be bonded to the touch sensor 112 or the display panel 111.

Figure 3:
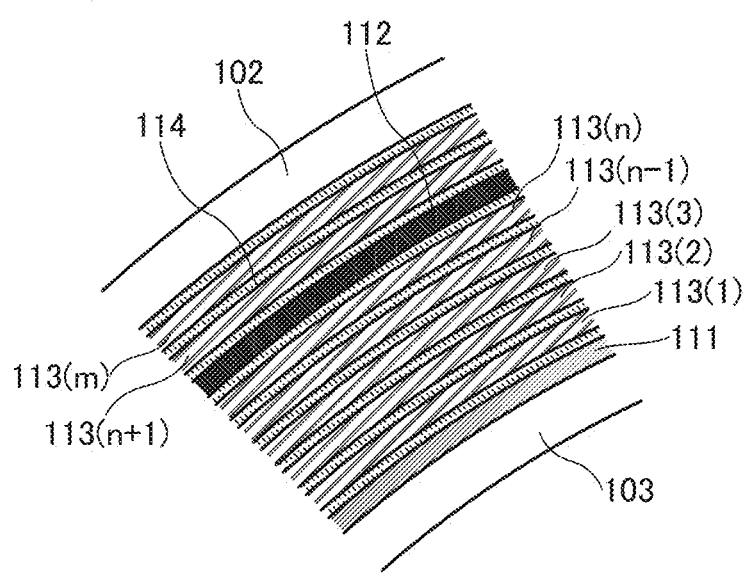
FIG. 3 illustrates a structure example of a touch panel.

As illustrated in FIG. 3, between the touch sensor 112 and the exterior component 102, at least one film layer 113 may be provided so that each film layer 113 is sandwiched between the bonding layers 114. Such a film layer 113 can easily adjust the distance between the touch sensor 112 and the exterior component 102 serving as a touch surface, and the detection sensitivity of the touch panel 100 can be optimized easily without changing the design of a circuit for driving the touch panel 100.

FIG. 3 illustrates a structure where two film layers 113 are sandwiched between the exterior component 102 and the touch sensor 112. Here, among the film layers sandwiched between the exterior component 102 and the touch sensor 112, the film layer 113 nearest to the exterior component 102 is referred to as a film layer 113(m) (m is an integer of n+1 or more), and the film layer 113 nearest to the touch sensor 112 is referred to as a film layer 113(n+1).

Manufacturing Method Example

An example of a method for manufacturing the touch panel 100 will be described with reference to FIGS. 4A1, 4A2, 4B1, 4B2, 4C1, 4C2, and 4D.

First, the support 103 is prepared. The support 103 can be used as a component incorporated in the housing 101 later. Alternatively, the support 103 serving as a mold may be used when a different support is used to mount the touch panel 100 in the housing 101 or when part of the housing 101 is used as a support.

Then, the display panel 111 is placed to be curved along a surface of the support 103 (FIGS. 4A1 and 4A2). At this time, the support 103 and the display panel 111 are preferably fixed with an adhesive, a pressure-sensitive adhesive, or the like. When the touch panel 100 is detached from the support 103 later, it is preferable to use an adhesive or a pressure-sensitive adhesive with which separation is easily performed.

Next, the film layer 113 is attached along a surface of the display panel 111 with the bonding layer 114 (not shown) (FIGS. 4B1 and 4B2). At this time, to cover the entire surface of the display panel 111, the film layer 113 is preferably attached so that its end portion is placed outside the display panel 111.

The step of attaching the film layer 113 in such a manner is repeated the number of times equal to the number of the film layers 113, whereby a stacked-layer structure of the film layers 113 can be obtained.

Then, the touch sensor 112 is attached along a surface of the film layer 113 (specifically the film layer 113(n)) with the bonding layer 114 (not shown) (FIGS. 4C1 and 4C2).

When another film layer is provided along a surface of the touch sensor 112 as illustrated in FIG. 3, it is provided in the same manner as the film layer 113.

FIG. 4D illustrates a state where the touch panel 100 is detached from the support 103. The form of the touch panel 100 can be maintained even after the touch panel 100 is detached from the support 103.

The touch panel 100 can be manufactured through these steps.

If the display panel 111, the n film layers 113, and the touch sensor 112 are sequentially stacked along a flat surface to form a touch panel and the touch panel is curved along the support 103, external force occurs in the direction where the touch sensor 112, which is the most distant from the support 103, is particularly pulled along the curve; thus, the touch sensor 112 might be damaged.

In contrast, by using the method of sequentially providing the display panel 111, the n film layers 113, and the touch sensor 112 on the surface of the support 103, stress applied to the display panel 111 and the touch sensor 112 when they are curved is reduced, and a substrate included in the display panel 111 or the touch sensor 112 or a wiring, an element, and the like provided over the substrate can be prevented from being damaged. Thus, the highly reliable touch panel 100 can be provided.

When the display panel 111, the film layers 113, and the touch sensor 112 are curved along the curved surface, stress applied to them increases depending on their thickness. However, the thickness of each of the display panel 111, the n film layers 113, and the touch sensor 112 is sufficiently small, so that no defect is caused by stress due to their thickness.

If a flat-plate touch panel is curved, the touch panel cannot maintain the curved form without a support and returns to a flat-plate shape. In contrast, the curved shape of the touch panel 100 fabricated according to this manufacturing method example can be maintained even when the touch panel 100 is detached from the support 103 (is not supported by the support 103) as illustrated in FIG. 4D.

If a flat-plate touch panel is curved and fixed to a support, stress is applied to the touch panel all the time, which might decrease long-term reliability. In contrast, the touch panel 100 fabricated with this manufacturing method example maintains its curved form, so that unintentional stress is not applied to the touch panel 100 and the touch panel 100 with high reliability can be obtained as a result.

When this manufacturing method example is used, the number of film layers 113 stacked to increase the distance between the display panel 111 and the touch sensor 112 is unlimited, and the touch panel can keep its curved form without problems even in the case where the number of stacked film layers 113 is extremely large and the distance between the display panel 111 and the touch sensor 112 increases. In contrast, in the case where a flat-plate touch panel is curved, the touch sensor 112 is damaged even when the distance between the display panel 111 and the touch sensor 112 is large.

By using this manufacturing method example, stress applied to the display panel 111, the touch sensor 112, and the like due to bending can be extremely small, so that the allowable radius of curvature at the time of bending the touch panel 100 can be extremely small. Furthermore, the distance between the display panel 111 and the touch sensor 112 can be sufficiently large when the touch panel 100 is bent with a small radius of curvature, resulting in higher detection sensitivity of the touch panel 100.

In the above description, the display surface (the side where the touch sensor 112 is provided) of the touch panel 100 has a convex curve; alternatively, the display surface can have a concave surface.

[Electronic Devices]

FIGS. 5A1, 5A2, 5B1, 5B2, 5C1, and 5C2 illustrate examples of an electronic device in which the position of the touch panel 100 is different from that in FIGS. 1A1 and 1A2. In FIGS. 5A1 and 5A2, the touch panel 100 is provided over most of the back surface of the housing 101. In FIGS. 5B1 and 5B2, the touch panel 100 extends from the right side surface to the left side surface across the front surface. In FIGS. 5C1 and 5C2, the touch panel 100 extends from the back surface to the back surface across the right side surface, front surface, and left side surface.

Without limitation to the above structures, the electronic device can be configured so that the touch panel 100 is provided along a curved surface of the housing in various different manners. Although the surface of the housing is convex in the above examples, the surface may be concave or may have a shape including both a convex and a concave, such as a wave shape.

At least part of this embodiment can be implemented in combination with any of the other embodiments described in this specification as appropriate.

Embodiment 2

This embodiment will explain examples of a touch sensor and a display panel used in the touch panel of one embodiment of the present invention.

[Touch Sensor]

Figure 6:
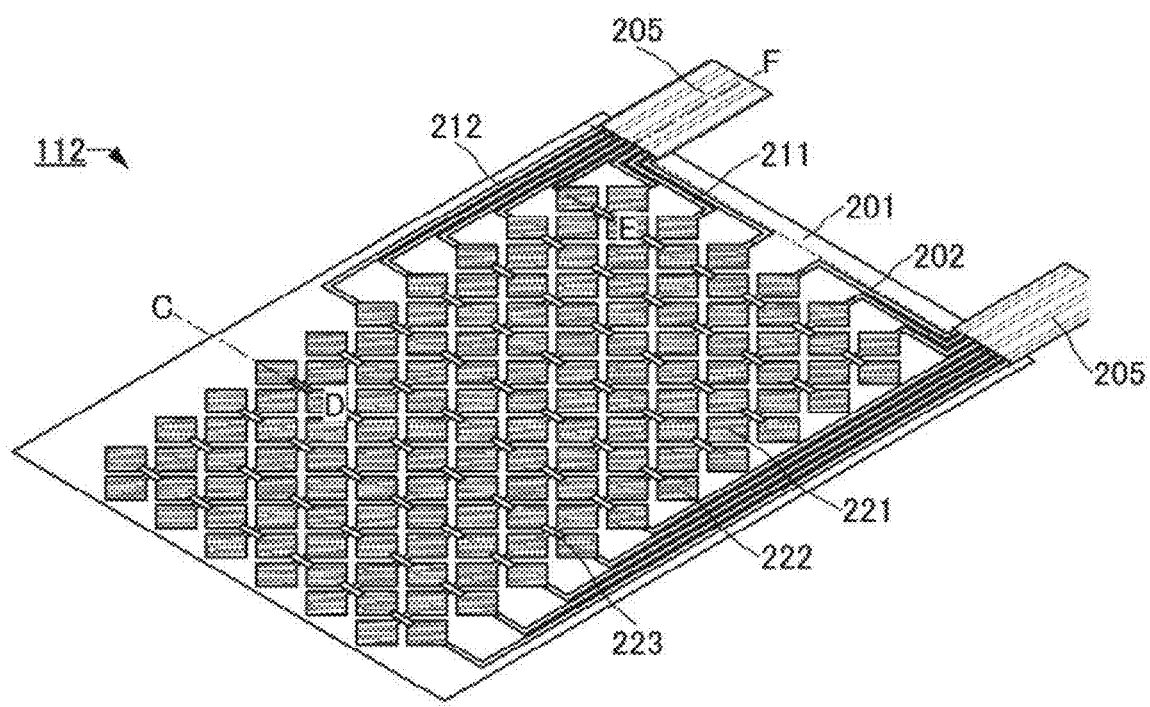
FIG. 6 illustrates a structure example of a touch sensor.

FIG. 6 is a schematic perspective diagram of the touch sensor 112. FIGS. 7A to 7C are schematic cross-sectional diagrams along lines C-D and E-F in FIG. 6.

As the touch sensor 112, a capacitive touch sensor can be used, for example. Examples of a capacitive touch sensor are a surface capacitive touch sensor and a projected capacitive touch sensor. Examples of a projected capacitive touch sensor are a self-capacitive touch sensor and a mutual capacitive touch sensor, which differ mainly in the driving method. The use of a mutual capacitive touch sensor is preferable because multiple points can be sensed simultaneously. An example of using a projected capacitive touch sensor will be described below.

The touch sensor 112 includes a plurality of electrodes 221 and a plurality of electrodes 222 between a flexible substrate 201 and a flexible substrate 202. The electrode 221 is electrically connected to one of a plurality of wirings 211. The electrode 222 is electrically connected to one of a plurality of wirings 212. The wirings 211 and 212 are extended to the periphery of the substrate 201 and electrically connected to a flexible printed circuit (FPC) 205.

The electrode 221 has a shape extending in one direction. Each of the electrodes 222 is provided between two electrodes 221. Two electrodes 222 between which the electrode 221 is placed are electrically connected to each other by a wiring 223 that intersects with the electrode 221. A dielectric layer 224 is provided between the wiring 223 and the electrode 221, so that a capacitor is formed. In the touch sensor 112, the plurality of electrodes 222 are electrically connected by the wirings 223 and arranged in one direction, and the plurality of electrodes 221 are arranged in the direction intersecting with the direction of the electrodes 222; thus, capacitors are arranged in a matrix.

The electrode 221, the electrode 222, and the wiring 223 preferably have a light-transmitting property. As shown in FIG. 6, the electrodes 221 and 222 preferably have a shape with which hardly any space is generated therebetween. Moreover, a dummy electrode including the same conductive film as the electrode 221, the electrode 222, or the wiring 223 may be provided at the space between the electrodes 221 and 222. Reducing a space between the electrodes 221 and 222 as much as possible in such a manner can reduce transmittance unevenness. As a result, unevenness in luminance of light transmitted through the touch sensor 112 can be reduced.

As a light-transmitting conductive material, a conductive oxide such as indium oxide, indium tin oxide, indium zinc oxide, zinc oxide, or zinc oxide to which gallium is added, or graphene can be used.

The electrodes 221 and 222 and the wiring 223 can be formed in such a manner that a light-transmitting conductive material is deposited on the substrate 201 by sputtering and then an unnecessary portion is removed by any of various patterning techniques such as photolithography. Graphene may be formed by CVD or by application of a solution in which graphene oxide is dispersed and subsequent reduction of graphene oxide.

The wiring 212 is electrically connected to the electrode 222. The wiring 212 is provided so that its surface is exposed at the periphery of the substrate 201, and can be electrically connected to the FPC 205 through a connection layer 255. Note that the wiring 211 electrically connected to the electrode 221 can have a similar structure.

For the wirings 211 and 212, a metal material such as aluminum, gold, platinum, silver, nickel, titanium, tungsten, chromium, molybdenum, iron, cobalt, copper, or palladium or an alloy material containing any of these metal materials can be used.

For the connection layer 255, an anisotropic conductive film (ACF), an anisotropic conductive paste (ACP), or the like can be used.

In the cross-sectional structure example in FIG. 7A, the electrode 221 and the electrode 222 are formed over an insulating layer 220. The substrate 201 and the insulating layer 220 are attached to each other with a bonding layer 231 placed therebetween. The substrate 202 and the substrate 201 provided with the electrodes and the like are attached to each other with a bonding layer 232.

The bonding layer 231 and the bonding layer 232 have a light-transmitting property. A thermosetting resin or an ultraviolet curable resin can be used; for example, an acrylic resin, a urethane resin, an epoxy resin, or a resin having a siloxane bond can be used.

A protection layer 235 is preferably provided on a surface of the substrate 202. The protection layer 235 can be referred to as a ceramic coat and has a function of protecting the surface of the substrate 202 when the touch sensor 112 is operated with a finger, a stylus, or the like. The provision of the protection layer 235 is particularly preferred when the exterior component 102 is not provided. The protection layer 235 can be formed using an inorganic insulating material such as silicon oxide, aluminum oxide, yttrium oxide, or yttria-stabilized zirconia (YSZ) by sputtering, a sol-gel method, or the like. Aerosol deposition is particularly preferably employed to form the protection layer 235, in which case a high-density film can be formed at low temperature and mechanical strength can be increased as a result.

The protection layer 235 is provided at least on the touch surface. FIG. 7A shows the case where the protection layer 235 is provided on the surface of the substrate 202; alternatively, the protection layer 235 may be provided on a surface of the substrate 201.

It is possible that the bonding layer 231 is not provided. FIG. 7B illustrates a structure where the insulating layer 220 is provided on a top surface of the substrate 201. FIG. 7C illustrates a structure where the insulating layer 220 is also omitted and the electrode 221, the electrode 222, and the like are provided over the substrate 201.

The above is the description of the touch sensor.

[Display Panel]

Figure 8:
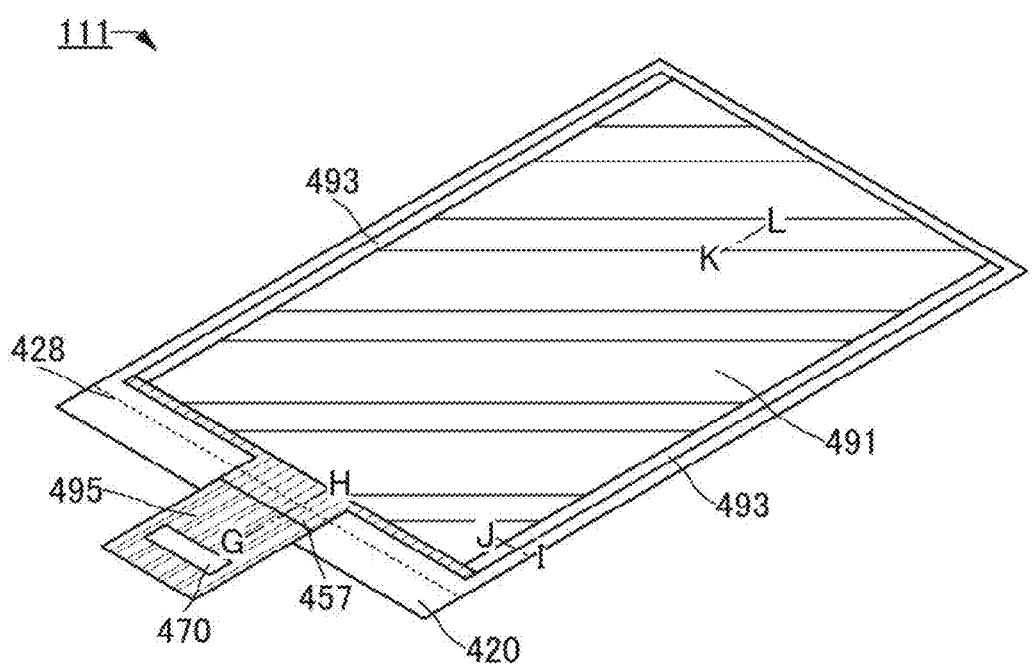
FIG. 8 illustrates a structure example of a display panel.

FIG. 8 is a schematic perspective diagram of the display panel 111.

The display panel 111 includes a display portion 491 including a plurality of pixels and a wiring 457 for supplying a signal and power to the display portion 491. The pixel included in the display portion 491 is preferably provided with a transistor and a display element. Typical examples of the display element include an organic EL element, a liquid crystal element, electronic ink, electronic liquid powder, and an electrophoretic element.

In FIG. 8, the display panel 111 includes a driver circuit 493 in addition to the display portion 491. As the driver circuit 493, a circuit functioning as a scan line driver circuit or a signal line driver circuit, for example, can be used.

Figure 9:
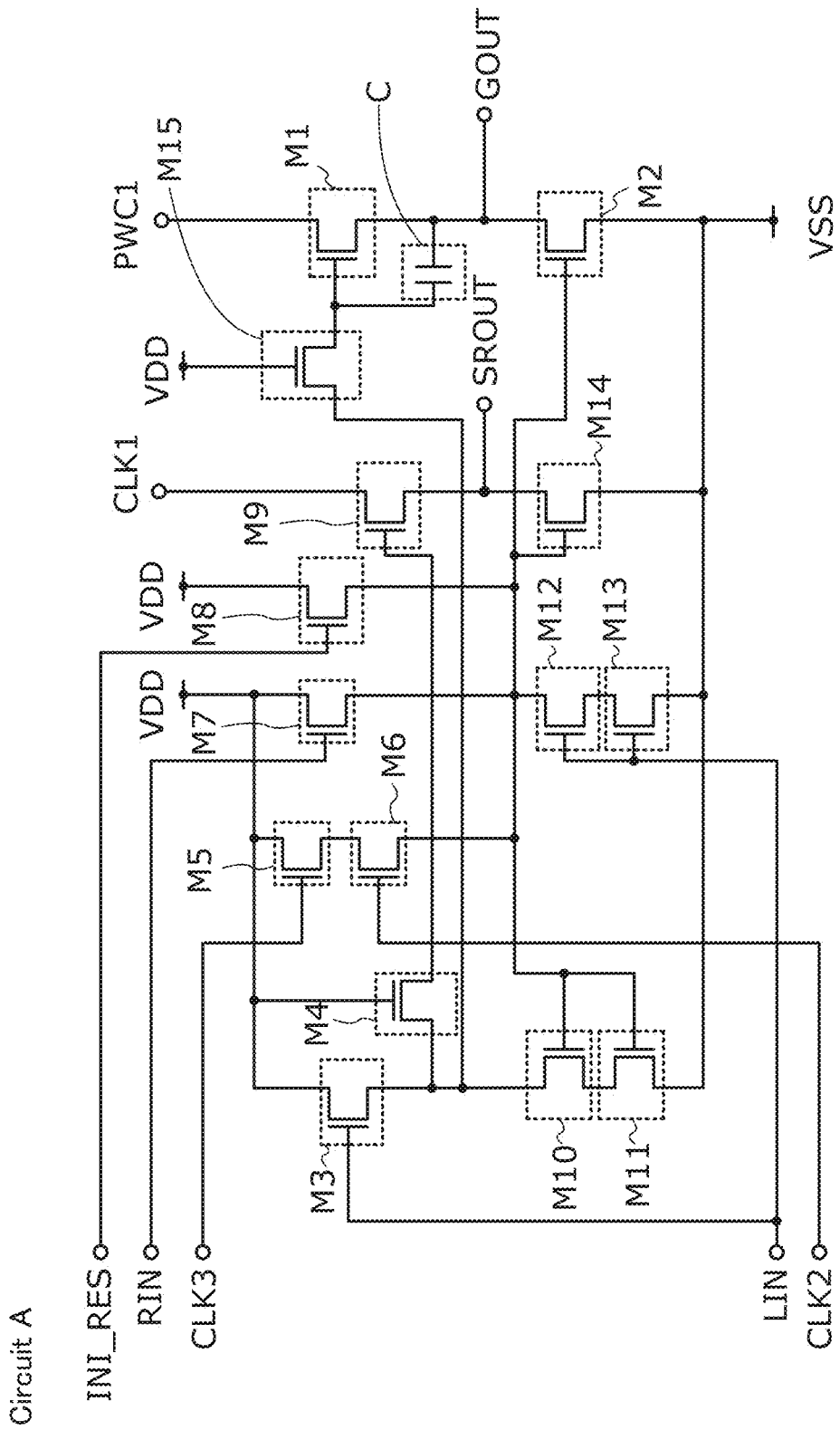
FIG. 9 illustrates a configuration example of a circuit applicable to a display panel.

When the driver circuit 493 serves as a scan line driver circuit, a circuit (circuit A) shown in FIG. 9 can be used. The circuit A in FIG. 9 includes transistors M1 to M15. Each of the transistors preferably contains an oxide semiconductor as a semiconductor in which a channel is formed. The transistor containing an oxide semiconductor exhibits ultralow off-state current. The use of such a transistor in the circuit can reduce shoot-through current compared with a CMOS circuit containing low-temperature polysilicon, and noise generated from the circuit can be reduced. Consequently, the detection sensitivity of the touch panel 100 can be increased.

An FPC 495 is electrically connected to the wiring 457 in FIG. 8. A signal and power for driving the display panel 111 can be supplied from the FPC 495 through the wiring 457.

FIG. 8 illustrates an example where an IC 470 is mounted on the FPC 495 by COF. As the IC 470, an IC functioning as a scan line driver circuit or a signal line driver circuit can be used. Note that it is possible that the IC 470 is not provided when the display panel 111 includes circuits serving as a scan line driver circuit and a signal line driver circuit and when circuits serving as a scan line driver circuit and a signal line driver circuit are externally provided and a signal for driving the display panel 111 is input through the FPC 495.

Cross-Sectional Structure Example 1

An example of a cross-sectional structure of the display panel 111 will be described below. Here, the display panel 111 is a light-emitting device using an organic EL element.

Figure 10A:
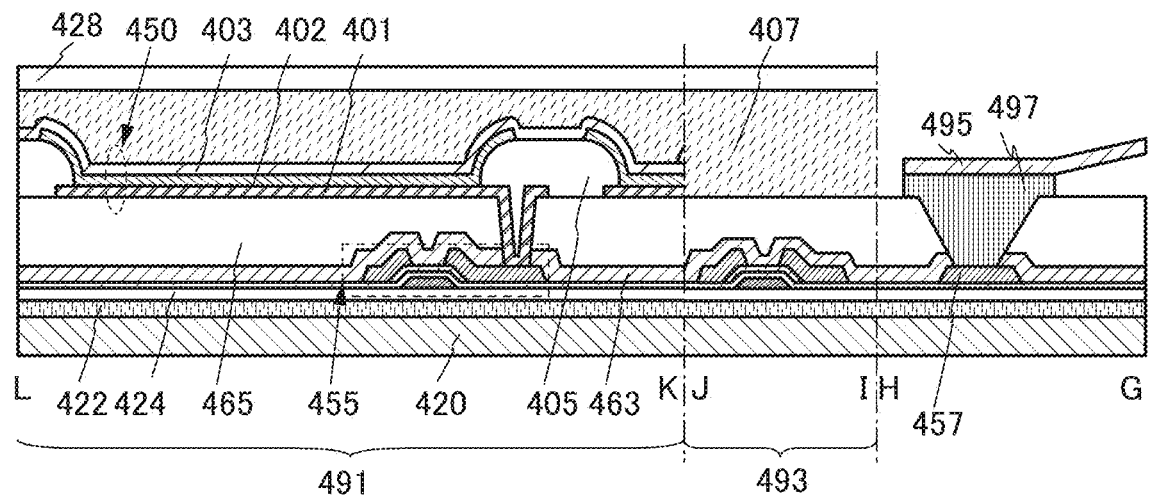
FIGS. 10A and 10B illustrate structure examples of a display panel.

FIG. 10A is a schematic cross-sectional diagram along lines G-H, I-J, and K-L in FIG. 8. The display panel illustrated in FIG. 10A is a top-emission display panel fabricated by separately depositing light-emitting layers of different colors.

The display panel illustrated in FIG. 10A includes the display portion 491, the driver circuit 493, and the FPC 495. An organic EL element and transistors included in the display portion 491 and the driver circuit 493 are sealed with a substrate 420, a substrate 428, and a bonding layer 407.

The display panel in FIG. 10A includes the substrate 420, a bonding layer 422, an insulating layer 424, a transistor 455, an insulating layer 463, an insulating layer 465, an insulating layer 405, an organic EL element 450 (a lower electrode 401, an EL layer 402, and an upper electrode 403), the bonding layer 407, the substrate 428, and a wiring 457. The substrate 428, the bonding layer 407, and the upper electrode 403 transmit visible light.

In the display portion 491 of the display panel in FIG. 10A, the transistor 455 and the organic EL element 450 are provided over the substrate 420 with the bonding layer 422 and the insulating layer 424 placed therebetween. The organic EL element 450 includes the lower electrode 401 over the insulating layer 465, the EL layer 402 over the lower electrode 401, and the upper electrode 403 over the EL layer 402. The lower electrode 401 is electrically connected to a source electrode or a drain electrode of the transistor 455. The lower electrode 401 preferably reflects visible light. An end portion of the lower electrode 401 is covered with the insulating layer 405.

The driver circuit 493 includes a plurality of transistors. FIG. 10A illustrates one of the transistors in the driver circuit 493.

The wiring 457 is electrically connected to an external input terminal through which a signal (e.g., a video signal, a clock signal, a start signal, or a reset signal) or a potential from the outside is transmitted to the driver circuit 493. Here, the FPC 495 is provided as the external input terminal as an example.

To prevent an increase in the number of fabrication steps, the wiring 457 is preferably formed using the same material and the same step as those of the electrode or the wiring in the display portion or the driver circuit. Here, an example is described in which the wiring 457 is formed using the same material and the same step as those of the source and drain electrodes of the transistor.

The insulating layer 463 has an effect of suppressing diffusion of impurities into a semiconductor included in the transistor. As the insulating layer 465, an insulating film having a planarization function is preferably used to reduce surface unevenness due to the transistor.

Cross-Sectional Structure Example 2

Figure 10B:
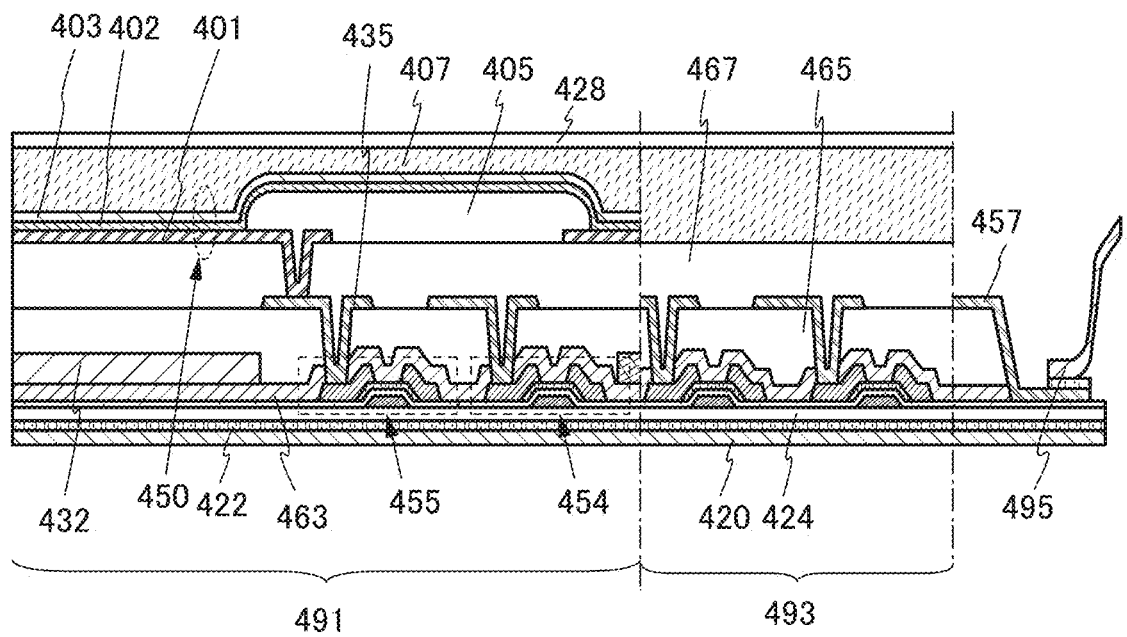

FIG. 10B illustrates a cross-sectional structure of the display panel different from the above. The display panel illustrated in FIG. 10B is a bottom-emission display panel fabricated using a color filter method.

The display panel in FIG. 10B includes the substrate 420, the bonding layer 422, the insulating layer 424, a transistor 454, the transistor 455, the insulating layer 463, a coloring layer 432, the insulating layer 465, a conductive layer 435, an insulating layer 467, the insulating layer 405, the organic EL element 450 (the lower electrode 401, the EL layer 402, and the upper electrode 403), the bonding layer 407, the substrate 428, and the wiring 457. The substrate 420, the bonding layer 422, the insulating layer 424, the insulating layer 463, the insulating layer 465, the insulating layer 467, and the lower electrode 401 transmit visible light.

In the display portion 491 of the display panel in FIG. 10B, the switching transistor 454, the current control transistor 455, and the organic EL element 450 are provided over the substrate 420 with the bonding layer 422 and the insulating layer 424 placed therebetween. The organic EL element 450 includes the lower electrode 401 over the insulating layer 467, the EL layer 402 over the lower electrode 401, and the upper electrode 403 over the EL layer 402. The lower electrode 401 is electrically connected to the source electrode or the drain electrode of the transistor 455 through the conductive layer 435. An end portion of the lower electrode 401 is covered with the insulating layer 405. The upper electrode 403 preferably reflects visible light. The display panel includes, over the insulating layer 463, the coloring layer 432 overlapping with the organic EL element 450.

The driver circuit 493 includes a plurality of transistors. FIG. 10B illustrates two of the transistors included in the driver circuit 493.

The wiring 457 is electrically connected to an external input terminal through which a signal or a potential from the outside is transmitted to the driver circuit 493. Here, the wiring 457 is formed using the same material and the same step as those of the conductive layer 435.

The insulating layer 463 has an effect of suppressing diffusion of impurities into a semiconductor included in the transistor. As the insulating layer 465 and the insulating layer 467, an insulating film having a planarization function is preferably used to reduce surface unevenness due to the transistors and the wirings.

Cross-Sectional Structure Example 3

Figure 11:
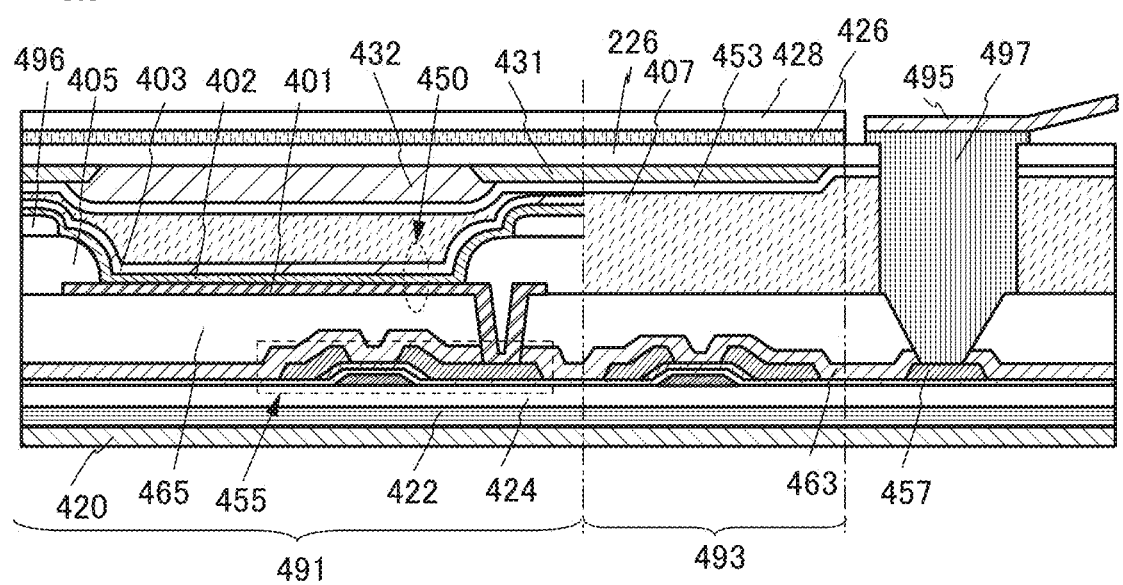
FIG. 11 illustrates a structure example of a display panel.

FIG. 11 illustrates a cross-sectional structure of the display panel different from the above. The display panel illustrated in FIG. 11 is a top-emission display panel fabricated using a color filter method.

The display panel in FIG. 11 includes the substrate 420, the bonding layer 422, the insulating layer 424, the transistor 455, the insulating layer 463, the insulating layer 465, the insulating layer 405, the organic EL element 450 (the lower electrode 401, the EL layer 402, and the upper electrode 403), the bonding layer 407, a light-blocking layer 431, the coloring layer 432, an overcoat 453, an insulating layer 226, a bonding layer 426, the substrate 428, and the wiring 457. The substrate 428, the bonding layer 426, the insulating layer 226, the overcoat 453, the bonding layer 407, and the upper electrode 403 transmit visible light.

In the structure of FIG. 11, an insulating layer 496 is provided over the insulating layer 405. Providing the insulating layer 496 serving as a spacer over the insulating layer 405 prevents the distance between the substrates from being smaller than the predetermined distance.

In the display portion 491 of the display panel in FIG. 11, the transistor 455 and the organic EL element 450 are provided over the substrate 420 with the bonding layer 422 and the insulating layer 424 placed therebetween. The organic EL element 450 includes the lower electrode 401 over the insulating layer 465, the EL layer 402 over the lower electrode 401, and the upper electrode 403 over the EL layer 402. The lower electrode 401 is electrically connected to the source electrode or the drain electrode of the transistor 455. An end portion of the lower electrode 401 is covered with the insulating layer 405. The lower electrode 401 preferably reflects visible light. Moreover, the display panel includes the coloring layer 432 overlapping with the organic EL element 450 with the bonding layer 407 therebetween, and the light-blocking layer 431 overlapping with the insulating layer 405 with the bonding layer 407 therebetween.

The driver circuit 493 includes a plurality of transistors. FIG. 11 illustrates one of the transistors in the driver circuit 493.

The wiring 457 is electrically connected to an external input terminal through which a signal or a potential from the outside is transmitted to the driver circuit 493. Here, as an example, the FPC 495 is provided as the external input terminal, and the wiring 457 is formed using the same material and the same step as those of the source and drain electrodes of the transistor 455. A connector 497 over the insulating layer 226 is connected to the wiring 457 through an opening provided in the insulating layer 226, the overcoat 453, the bonding layer 407, the insulating layer 465, and the insulating layer 463. The connector 497 is connected to the FPC 495. The FPC 495 and the wiring 457 are electrically connected through the connector 497.

Manufacturing Method Example

Here, a method for manufacturing a flexible touch sensor or a flexible display panel will be described.

Here, a component including a pixel and a driver circuit or a component including an optical component such as a color filter in a display panel, or a component including an electrode and a wiring in a touch sensor is referred to as an element layer for convenience. An element layer includes a display element, for example, and may also include a wiring electrically connected to the display element and an element used in a pixel or a circuit, such as a transistor.

Furthermore, a support provided with an insulating surface where an element layer is formed is referred to as a base.

As a method for forming an element layer over a flexible base, there are a method in which an element layer is formed directly on a base; and a method in which an element layer is formed over a supporting base that is different a base and has stiffness, and then the element layer is separated from the supporting base and transferred to the base.

When the material of the base can withstand heating temperature in the process for forming the element layer, the element layer is preferably formed directly on the base, in which case the manufacturing process can be simplified. At this time, the element layer is preferably formed in a state where the base is fixed to the supporting base, in which case transfer of the element layer in an apparatus and between apparatuses can be easy.

In the case of employing the method in which the element layer is formed over the supporting base and then transferred to the base, first, a separation layer and an insulating layer are stacked over the supporting base, and then the element layer is formed over the insulating layer. Then, the element layer is separated from the supporting base and then transferred to the base. In this case, materials are selected so that separation occurs at the interface between the supporting base and the separation layer, at the interface between the separation layer and the insulating layer, or in the separation layer. With such a method, the element layer can be formed at temperatures higher than the upper temperature limit of the base, which improves the reliability.

It is preferred that the separation layer have a stacked-layer structure using a layer containing a high-melting-point metal material (e.g., tungsten) and a layer containing an oxide of the metal material, and a layer in which a plurality of layers such as a silicon nitride layer and a silicon oxynitride layer are stacked be formed over the separation layer as the insulating layer. By using a high-melting-point metal material, a high-temperature process can be performed to form the element layer, resulting in high reliability. Impurities contained in the element layer can be further reduced, and the crystallinity of a semiconductor or the like included in the element layer can be further increased.

Examples of the separation include peeling off by application of mechanical power, removal of the separation layer by etching, or separation by dripping of a liquid into part of the separation interface to penetrate the entire separation interface. Alternatively, the separation may be performed by heating the separation interface by utilizing a difference in coefficient of thermal expansion.

The separation layer is not necessary when separation can be performed at the interface between the supporting base and the insulating layer. For example, it is possible that glass is used as the supporting base, an organic resin such as polyimide is used for the insulating layer, a starting point of separation is set by locally heating the organic resin with laser light or the like, and separation is performed at the interface between the glass and the insulating layer. Alternatively, it is possible that a layer containing a material with high thermal conductivity (e.g., a metal or a semiconductor) is provided between the supporting base and the insulating layer containing an organic resin, and this layer is heated by current so that separation easily occurs, and then separation is performed. In this case, the insulating layer containing an organic resin can also be used as the base.

Examples of a material of the flexible base include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, polytetrafluoroethylene (PTFE), a polyamide resin, a cycloolefin resin, a polystyrene resin, a polyamide imide resin, and a polyvinyl chloride resin. In particular, it is preferable to use a material with a low thermal expansion coefficient, for example, a polyamide imide resin, a polyimide resin, or PET, which has a thermal expansion coefficient of $30 \times 10^{-6}$/K or lower. It is also possible to use a substrate in which a fibrous body is impregnated with a resin (also referred to as prepreg) or a substrate whose thermal expansion coefficient is reduced by mixing an inorganic filler with an organic resin.

In the case where a fibrous body is included in the above material, a high-strength fiber of an organic compound or an inorganic compound is used as the fibrous body. The high-strength fiber is specifically a fiber with a high tensile modulus of elasticity or a fiber with a high Young's modulus. Typical examples include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as a flexible substrate. The structure body including the fibrous body and the resin is preferably used as a flexible substrate, in which case the reliability against bending and damage due to local pressure can be increased.

Examples of Materials

Next, materials and the like that can be used for the display panel will be described. Note that the description of the components already described in this embodiment is omitted.

As a light-emitting element, a self-luminous element can be used, and an element whose luminance is controlled by current or voltage is included in the category of the light-emitting element. For example, a light-emitting diode (LED), an organic EL element, or an inorganic EL element can be used.

There is no particular limitation on the structure of the transistors in the display panel. For example, a forward staggered transistor or an inverted staggered transistor may be used. A top-gate transistor or a bottom-gate transistor may be used. There is no particular limitation on a semiconductor material used for the transistors, and for example, silicon, germanium, or an oxide semiconductor may be used.

There is no particular limitation on the state of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

Here, for the transistors, a polycrystalline semiconductor such as polycrystalline silicon is preferably used. Polycrystalline silicon can be formed at lower temperature than single crystal silicon and has higher field-effect mobility and higher reliability than amorphous silicon. The use of such a polycrystalline semiconductor in pixels increases the aperture ratio of the pixels. Furthermore, by using a polycrystalline semiconductor, a gate driver circuit and a source driver circuit can be formed over a substrate where pixels are provided even when the pixel density is quite high; thus, the number of components included in an electronic device can be decreased.

Furthermore, an oxide semiconductor is preferably used for the transistor. For example, an oxide semiconductor having a wide band gap than silicon is preferably used. A semiconductor material having a wider band gap and a lower carrier density than silicon is preferably used because the off-state current of the transistor can be reduced.

For example, the oxide semiconductor preferably contains at least indium (In) or zinc (Zn). The oxide semiconductor more preferably contains In-M-Zn-based oxide (M is a metal such as Al, Ti, Ga, Ge, Y, Zr, Sn, La, Ce, or Hf).

As the oxide semiconductor, for example, any of the following can be used: indium oxide, tin oxide, zinc oxide, In—Zn-based oxide, Sn—Zn-based oxide, Al—Zn-based oxide, Zn—Mg-based oxide, Sn—Mg-based oxide, In—Mg-based oxide, In—Ga-based oxide, In—Ga—Zn-based oxide (also referred to as IGZO), In—Al—Zn-based oxide, In—Sn—Zn-based oxide, Sn—Ga—Zn-based oxide, Al—Ga—Zn-based oxide, Sn—Al—Zn-based oxide, In—Hf—Zn-based oxide, In—Zr—Zn-based oxide, In—Ti—Zn-based oxide, In—Sc—Zn-based oxide, In—Y—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

Here, an In—Ga—Zn-based oxide means an oxide containing In, Ga, and Zn as its main components, and there is no particular limitation on the ratio of In, Ga, and Zn. The In—Ga—Zn-based oxide may contain another metal element in addition to In, Ga, and Zn.

An oxide semiconductor film is classified roughly into a single crystal oxide semiconductor film and a non-single-crystal oxide semiconductor film. The non-single-crystal oxide semiconductor film includes any of a c-axis aligned crystalline oxide semiconductor (CAAC-OS) film, a polycrystalline oxide semiconductor film, a microcrystalline oxide semiconductor film, an amorphous oxide semiconductor film, and the like. Note that the CAAC-OS film is an oxide semiconductor film including a plurality of c-axis aligned crystal parts.

As the semiconductor layer, it is particularly preferable to use an oxide semiconductor film which includes a plurality of crystal parts with c-axes aligned perpendicular to a surface where the semiconductor layer is formed or the top surface of the semiconductor layer and in which the adjacent crystal parts have no grain boundary. Such an oxide semiconductor without grain boundary prevents a crack of an oxide semiconductor film from being caused by stress generated when a flexible device fabricated according to one embodiment of the present invention is bent. Consequently, such an oxide semiconductor is preferably used for a flexible display device that is bent when used.

The use of such materials for the semiconductor layer makes it possible to provide a highly reliable transistor in which a change in the electrical characteristics is suppressed.

In addition, the low off-state current of a transistor using such an oxide semiconductor enables long-term retention of charge stored in a capacitor through the transistor. The use of such a transistor in a pixel allows a driver circuit to stop while the luminance of an image displayed on a display region is maintained. Thus, an electronic device with ultralow power consumption can be provided.

Various wirings and electrodes in a touch panel as well as a gate, source, and drain of a transistor are formed with a single-layer structure or a stacked-layer structure using a metal such as aluminum, titanium, chromium, nickel, copper, yttrium, zirconium, molybdenum, silver, tantalum, and tungsten or an alloy containing any of these metals as its main component. For example, it is possible to employ a single-layer structure of an aluminum film containing silicon; a two-layer structure in which an aluminum film is stacked over a titanium film; a two-layer structure in which an aluminum film is stacked over a tungsten film; a two-layer structure in which a copper film is stacked over a copper-magnesium-aluminum alloy film; a two-layer structure in which a copper film is stacked over a titanium film; a two-layer structure in which a copper film is stacked over a tungsten film; a three-layer structure in which a titanium film or a titanium nitride film, an aluminum film or a copper film, and a titanium film or a titanium nitride film are stacked in this order; or a three-layer structure in which a molybdenum film or a molybdenum nitride film, an aluminum film or a copper film, and a molybdenum film or a molybdenum nitride film are stacked in this order. Note that a transparent conductive material containing indium oxide, tin oxide, or zinc oxide may be used. Copper containing manganese is preferably used because the shape controllability of etching is increased.

A light-emitting element included in the display panel includes a pair of electrodes and an EL layer between the pair of electrodes. One of the pair of electrodes functions as an anode and the other functions as a cathode.

The light-emitting element may have any of a top emission structure, a bottom emission structure, and a dual emission structure. A conductive film that transmits visible light is used as the electrode through which light is extracted. A conductive film that reflects visible light is preferably used as the electrode through which light is not extracted.

A conductive film that transmits visible light can be formed using, for example, indium oxide, indium tin oxide (ITO), indium zinc oxide, zinc oxide, or zinc oxide to which gallium is added. It is also possible to use a film that is formed of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) when the film is thin enough to have a light-transmitting property. Alternatively, a stack of any of the above materials can be used as the conductive film. For example, a stacked film of ITO and an alloy of silver and magnesium is preferably used, in which case the conductivity can be increased. Further alternatively, graphene or the like may be used.

For the conductive film that reflects visible light, a metal material such as aluminum, gold, platinum, silver, nickel, tungsten, chromium, molybdenum, iron, cobalt, copper, or palladium or an alloy containing any of these metal materials can be used, for example. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. When a metal film or a metal oxide film is stacked on an aluminum alloy film, oxidation of the aluminum alloy film can be suppressed. Examples of a material for the metal film or the metal oxide film are titanium and titanium oxide. Alternatively, the conductive film that transmits visible light and a film containing any of the above metal materials may be stacked. For example, a stacked film of silver and ITO or a stacked film of an alloy of silver and magnesium and ITO can be used.

The electrodes can be formed by an evaporation method or a sputtering method. Alternatively, a discharging method such as an ink-jet method, a printing method such as a screen printing method, or a plating method may be used.

When a voltage higher than the threshold voltage of the light-emitting element is applied between the lower electrode and the upper electrode, holes are injected to the EL layer from the anode side and electrons are injected to the EL layer from the cathode side. The injected electrons and holes are recombined in the EL layer, so that a light-emitting substance contained in the EL layer emits light.

The EL layer includes at least a light-emitting layer. In addition to the light-emitting layer, the EL layer may also include one or more layers containing any of a substance with a high hole-injection property, a substance with a high hole-transport property, a hole-blocking material, a substance with a high electron-transport property, a substance with a high electron-injection property, a substance with a bipolar property (a substance with high electron- and hole-transport properties), and the like.

For the EL layer, either a low molecular compound or a high molecular compound can be used, and an inorganic compound may also be used. The layers included in the EL layer can be formed by any of the following methods: an evaporation method (including a vacuum evaporation method), a transfer method, a printing method, an inkjet method, a coating method, and the like.

The light-emitting element is preferably provided between a pair of insulating films with a high gas barrier property. Thus, impurities such as water can be prevented from entering the light-emitting element, leading to prevention of a decrease in the reliability of the display panel.

Examples of the insulating layer with a high gas barrier property include a film containing nitrogen and silicon, such as a silicon nitride film or a silicon nitride oxide film, and a film containing nitrogen and aluminum, such as an aluminum nitride film. Alternatively, a silicon oxide film, a silicon oxynitride film, an aluminum oxide film, or the like may be used.

For example, the moisture vapor transmission rate of the insulating film with a high gas barrier property is $1 \times 10^{-5}$ g/m$^2$·day or less, preferably $1 \times 10^{-6}$ g/m$^2$·day or less, more preferably $1 \times 10^{-7}$ g/m$^2$·day or less, still more preferably $1 \times 10^{-8}$ g/m$^2$·day or less.

A flexible material is used for the flexible substrate. For example, an organic resin or a glass material that is thin enough to have flexibility can be used. Furthermore, a material that transmits visible light is used for a substrate of the display panel from which light emission is extracted. A metal substrate or the like may be used in the case where the flexible substrate does not need to transmit visible light.

An organic resin with a lower specific gravity than glass is preferably used for the flexible substrate, in which case the display panel can be lightweight as compared to the case of using glass.

Examples of a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, it is preferable to use a material with a low thermal expansion coefficient, for example, a polyamide imide resin, a polyimide resin, or PET. It is also possible to use a substrate in which a fibrous body is impregnated with a resin (also referred to as prepreg) or a substrate whose thermal expansion coefficient is reduced by mixing an inorganic filler with an organic resin.

In the case where a fibrous body is included in the material having flexibility and a light-transmitting property, a high-strength fiber of an organic compound or an inorganic compound is used as the fibrous body. The high-strength fiber is specifically a fiber with a high tensile modulus of elasticity or a fiber with a high Young's modulus. Typical examples include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure body in which this fibrous body is impregnated with a resin and the resin is cured may be used as a flexible substrate. The structure body including the fibrous body and the resin is preferably used as a flexible substrate, in which case the reliability against bending and damage due to local pressure can be increased.

To improve the light extraction efficiency, the refractive index of the material having flexibility and a light-transmitting property is preferably high. For example, a substrate obtained by dispersing an inorganic filler having a high refractive index into an organic resin can have a higher refractive index than the substrate formed of only the organic resin. In particular, an inorganic filler having a particle diameter as small as 40 nm or less is preferred because such a filler can maintain optical transparency.

To obtain flexibility and bendability, the thickness of a metal substrate ranges preferably from 10 μm to 200 μm, more preferably from 20 μm to 50 μm. Since the metal substrate has high thermal conductivity, heat generated due to light emission of a light-emitting element can be efficiently released.

There is no particular limitation on a material of the metal substrate, but it is preferable to use, for example, aluminum, copper, nickel, or an alloy such as an aluminum alloy or stainless steel.

The flexible substrate may have a structure in which a hard coat layer (e.g., a silicon nitride layer) by which a device surface is protected from damage, a layer (e.g., an aramid resin layer) that can disperse pressure, or the like is stacked over a layer of any of the above-mentioned materials. Furthermore, to suppress a decrease in the lifetime of the functional element (in particular, the organic EL element) due to moisture and the like, an insulating film with low water permeability described later may be included.

The flexible substrate may be formed by stacking a plurality of layers. When a glass layer is used, barrier properties against water and oxygen can be improved and thus a reliable display panel can be provided.

For example, a flexible substrate in which a glass layer, a bonding layer, and an organic resin layer are stacked from the side closer to an organic EL element can be used. The thickness of the glass layer ranges from 20 μm to 200 μm, preferably from 25 μm to 100 μm. With such a thickness, the glass layer can have both high barrier properties against water and oxygen and flexibility. The thickness of the organic resin layer ranges from 10 μm to 200 μm, preferably from 20 μm to 50 μm. By providing such an organic resin layer on the outer side of the glass layer, occurrence of a crack or a break in the glass layer can be suppressed and mechanical strength can be increased. With the substrate using such a composite material of a glass material and an organic resin, a highly reliable flexible display panel can be provided.

For the bonding layer, any of a variety of curable adhesives, for example, a light curable adhesive such as a UV curable adhesive, a reactive curable adhesive, a thermal curable adhesive, and an anaerobic adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Further alternatively, an adhesive sheet or the like may be used.

Furthermore, the resin may include a drying agent. For example, a substance that adsorbs moisture by chemical adsorption, such as oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent impurities such as moisture from entering the functional element, thereby improving the reliability of the display panel.

It is preferable to mix a filler with a high refractive index or a light-scattering material into the resin, in which case the efficiency of light extraction from the light-emitting element can be improved. For example, titanium oxide, barium oxide, zeolite, or zirconium can be used.

The above is the description of the display panel.

Note that in this specification and the like, a display element, a display device which is a device including a display element, a light-emitting element, and a light-emitting device which is a device including a light-emitting element can employ various modes or can include various elements. Examples of a display element, a display device, a light-emitting element, and a light-emitting device include an element and a device having a display medium whose contrast, luminance, reflectance, transmittance, or the like is changed by electromagnetic action, such as an EL element (e.g., an EL element including organic and inorganic materials, an organic EL element, and an inorganic EL element), an LED (e.g., a white LED, a red LED, a green LED, and a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micromirror device (DMD), a digital micro shutter (DMS), an interferometric modulator display (IMOD), an electrowetting element, a MEMS shutter display element, an optical-interference-type MEMS display element, a piezoelectric ceramic display, and a carbon nanotube. An example of a display device having EL elements is an EL display. Examples of a display device including electron emitters are a field emission display (FED) and an SED-type flat panel display (SED: surface-conduction electron-emitter display). An example of a display device including liquid crystal elements includes a liquid crystal display (e.g., a transmissive liquid crystal display, a transflective liquid crystal display, a reflective liquid crystal display, a direct-view liquid crystal display, and a projection liquid crystal display). An example of a display device having electronic ink, electronic liquid powder, or electrophoretic elements is electronic paper. In a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as SRAM can be provided under the reflective electrodes, leading to lower power consumption.

In this specification and the like, it is possible to employ an active matrix method in which an active element (a non-linear element) is included in a pixel or a passive matrix method in which an active element is not included in a pixel.

In the active matrix method, as an active element, not only a transistor but also a variety of active elements, for example, a metal insulator metal (MIM) or a thin film diode (TFD) can be used. These elements are manufactured with a small number of steps, resulting in low manufacturing cost or high yield. Furthermore, since these elements are small, the aperture ratio can be increased, leading to low power consumption and high luminance.

Since an active element is not used in a passive matrix method, the number of manufacturing steps is small, so that the manufacturing cost can be reduced or the yield can be improved. Furthermore, since an active element is not used, the aperture ratio can be improved, so that power consumption can be reduced or higher luminance can be achieved.

At least part of this embodiment can be implemented in combination with any of the other embodiments described in this specification as appropriate.

Embodiment 3

In this embodiment, electronic devices and lighting devices that can include the touch panel, the touch sensor, the display panel, or the light-emitting device of one embodiment of the present invention will be described with reference to FIGS. 12A to 12E and FIGS. 13A to 13D.

Examples of electronic devices include a television set (also referred to as a television or a television receiver), a monitor of a computer or the like, a camera such as a digital camera and a digital video camera, a digital photo frame, a mobile phone (also referred to as a cellular phone or mobile phone device), a portable game machine, a portable information appliance, an audio reproducing device, and a large game machine such as a pachinko machine.

The device manufactured according to one embodiment of the present invention has flexibility and therefore can be incorporated along a curved inside/outside wall surface of a house or a building or a curved interior/exterior surface of a car.

Figure 12A:
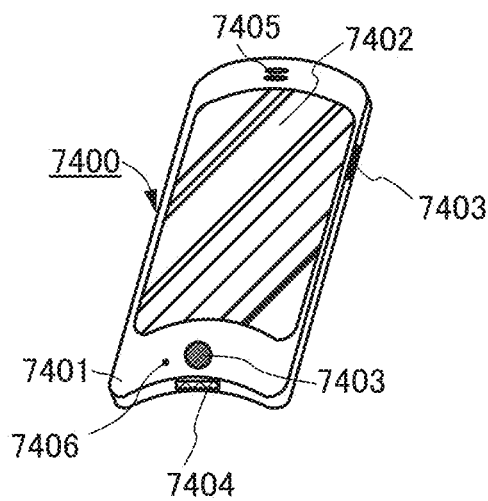
FIGS. 12A and 12B illustrate structure examples of an electronic device.

FIG. 12A illustrates an example of a mobile phone. A mobile phone 7400 is provided with a display portion 7402 incorporated in a housing 7401, an operation button 7403, an external connection port 7404, a speaker 7405, a microphone 7406, and the like. The mobile phone 7400 is manufactured using the display device manufactured according to one embodiment of the present invention for the display portion 7402. According to one embodiment of the present invention, a highly reliable mobile phone having a curved display portion can be provided with high yield.

When the display portion 7402 of the mobile phone 7400 in FIG. 12A is touched with a finger or the like, data can be input to the mobile phone 7400. Operations such as making a call and inputting letters can be performed by touch on the display portion 7402 with a finger or the like.

With the operation button 7403, the power can be turned on and off. Furthermore, types of images displayed on the display portion 7402 can be switched; for example, the image can be switched from a mail creation screen to a main menu.

Figure 12B:
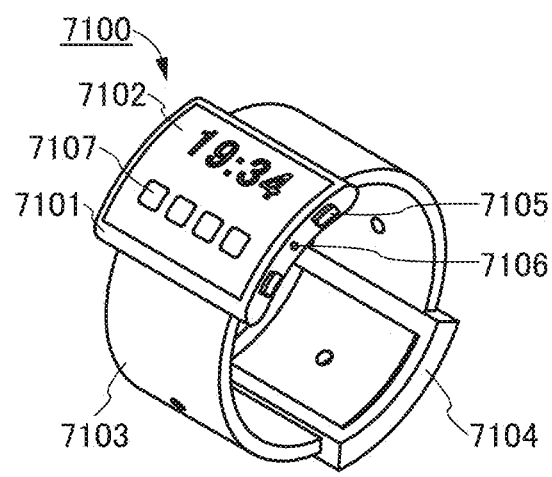

FIG. 12B illustrates an example of a wrist-watch-type portable information appliance. A portable information appliance 7100 includes a housing 7101, a display portion 7102, a band 7103, a buckle 7104, an operation button 7105, an input/output terminal 7106, and the like.

The portable information appliance 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. The display portion 7102 includes a touch sensor, and operation can be performed by touching the screen with a finger, a stylus, or the like. For example, an application can be started by touching an icon 7107 displayed on the display portion 7102.

With the operation button 7105, a variety of functions such as time setting, power on/off, on/off control of wireless communication, setting and cancellation of manner mode, and setting and cancellation of power saving mode can be performed. For example, the functions of the operation button 7105 can be set freely by the operation system incorporated in the portable information appliance 7100.

The portable information appliance 7100 can employ near field communication, which is a communication method based on an existing communication standard. In that case, for example, hands-free calling is achieved with mutual communication between the portable information appliance 7100 and a headset capable of wireless communication.

Since the portable information appliance 7100 includes the input/output terminal 7106, data can be directly transmitted to and received from another information appliance via a connector. Charging through the input/output terminal 7106 is possible. Note that the charging operation may be performed by wireless power feeding without using the input/output terminal 7106.

The display portion 7102 of the portable information appliance 7100 includes the display panel manufactured according to one embodiment of the present invention. According to one embodiment of the present invention, a highly reliable portable information appliance having a curved display portion can be provided with a high yield.

Figure 12C:
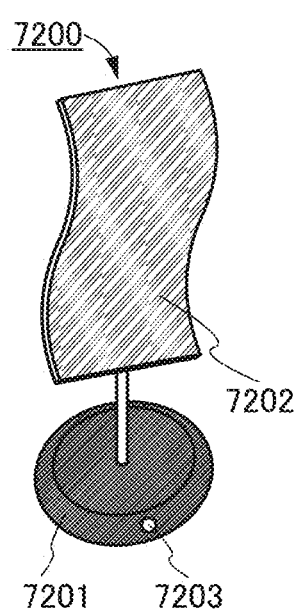
FIGS. 12C to 12E illustrate structure examples of a lighting device.
Figure 12D:
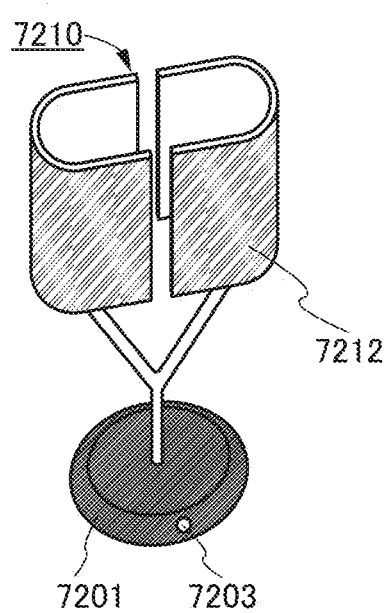
Figure 12E:
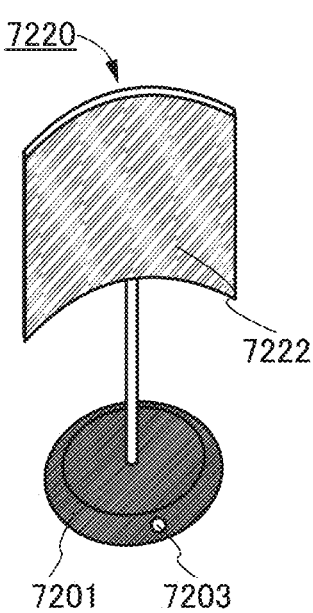

FIGS. 12C to 12E illustrate examples of lighting devices. Lighting devices 7200, 7210, and 7220 each include a stage 7201 provided with an operation switch 7203 and a light-emitting portion supported by the stage 7201.

The lighting device 7200 illustrated in FIG. 12C includes a light-emitting portion 7202 with a wave-shaped light-emitting surface and thus has an elaborate design.

A light-emitting portion 7212 included in the lighting device 7210 in FIG. 12D has two convex-curved light-emitting portions symmetrically placed. Thus, all directions can be illuminated with the lighting device 7210 as a center.

The lighting device 7220 illustrated in FIG. 12E includes a concave-curved light-emitting portion 7222. This is suitable for illuminating a specific range because light emitted from the light-emitting portion 7222 is collected at the front of the lighting device 7220.

The light-emitting portion included in each of the lighting devices 7200, 7210, and 7220 is flexible; accordingly, the light-emitting portion may be fixed on a plastic member, a movable frame, or the like so that a light-emitting surface of the light-emitting portion can be bent freely depending on the intended use.

Although the lighting devices in which the light-emitting portion is supported by the stage are described as an example, a housing provided with a light-emitting portion can be fixed on a ceiling or suspended from a ceiling. Since the light-emitting surface can be curved, the light-emitting surface can be bent concavely so that a particular region is brightly illuminated, or bent convexly so that the whole room is brightly illuminated.

When the light-emitting portion includes a touch panel, it is possible to achieve a novel lighting device where the color of light and luminance can be changed (light can be controlled) by touch on the light-emitting portion.

Figure 13A:
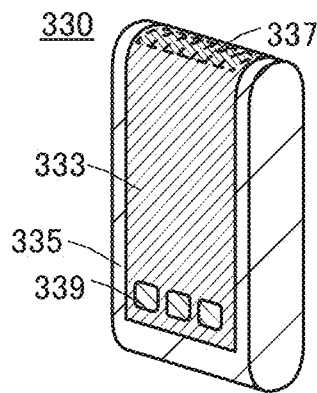
FIGS. 13A to 13D illustrate structure examples of an electronic device.
Figure 13B:
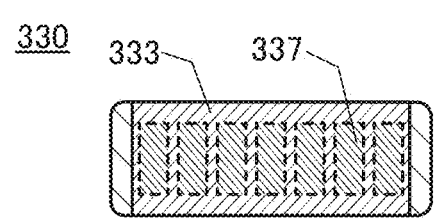
Figure 13C:
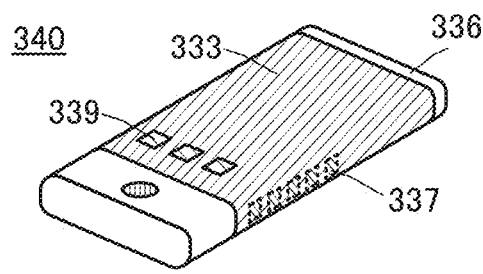

FIG. 13A is a perspective view illustrating the external shape of a portable information appliance 330. FIG. 13B is a top view of the portable information appliance 330. FIG. 13C is a perspective view illustrating the external shape of a portable information appliance 340.

The portable information appliances 330 and 340 function as one or more of a telephone set, an electronic notebook, and an information browsing system, for example. Specifically, each of the portable information appliances 330 and 340 can be used as a smartphone.

The portable information appliances 330 and 340 can display letters and image data on their plurality of surfaces. For example, three operation buttons 339 can be displayed on one surface (FIGS. 13A and 13C). Furthermore, information 337 indicated by dashed rectangles can be displayed on another surface (FIGS. 13B and 13C). Examples of the information 337 include an alert for an incoming email, social networking service (SNS) message, and call; the title and sender of an email and SNS massage; the date, the time, remaining battery, and the reception strength of an antenna. On the position where the information 337 is displayed, the operation button 339, an icon, or the like may be displayed instead of the information 337. Although FIGS. 13A and 13B show the example in which the information 337 is displayed at the top, one embodiment of the present invention is not limited to this example. For instance, the information 337 may be displayed on the side as in the portable information appliance 340 in FIG. 13C.

For example, a user can see the display (here, the information 337) with the portable information appliance 330 put in a breast pocket.

Specifically, a caller's phone number, name, or the like of an incoming call is displayed at a position that can be observed from above the portable information appliance 330. Thus, the user can see the display without taking out the portable information appliance 330 from the pocket and decide whether to answer the phone.

As a display portion 333 included in a housing 335 of the portable information appliance 330 and a housing 336 of the portable information appliance 340, the display device fabricated according to one embodiment of the present invention can be used. According to one embodiment of the present invention, a highly reliable display device having a curved display portion can be provided with high yield.

Figure 13D:
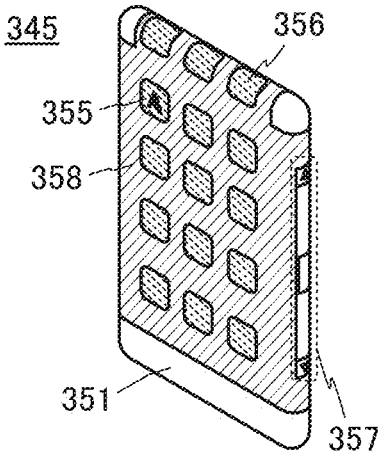

As in a portable information appliance 345 illustrated in FIG. 13D, information may be displayed on at least three surfaces. Here, as an example, information 355, information 356, and information 357 are displayed on different surfaces.

As a display portion 358 included in a housing 351 of the portable information appliance 345, the display device fabricated according to one embodiment of the present invention can be used. According to one embodiment of the present invention, a highly reliable display device having a curved display portion can be provided with high yield.

The touch panel, the touch sensor, the display panel, or the light-emitting device of one embodiment of the present invention can be used for the display portion in the electronic device and the light-emitting portion in the lighting device shown above. Consequently, it is possible to achieve a thin, light, and versatile electronic device with high detection sensitivity.

At least part of this embodiment can be implemented in combination with any of the other embodiments described in this specification as appropriate.

Example 1

[Electromagnetic Noise of Display Panel]

In this example, a display panel of one embodiment of the present invention was fabricated. Moreover, the results of examining electromagnetic noise from the display panel are shown.

As has been described, in the case where electromagnetic noise generated when the display panel operates affects a touch sensor, the detection sensitivity of the touch sensor might be decreased. For this reason, reducing electromagnetic noise caused by the display panel is effective in increasing the detection sensitivity of the touch sensor.

One of the factors in electromagnetic noise from the display panel is electromagnetic noise from a gate driver circuit (scan line driver circuit). A circuit functioning as a shift register is suitable for the gate driver circuit.

Changing the waveform of an input signal such as a clock signal is an effective way to reduce electromagnetic noise from a shift register circuit. Specifically, as an input signal, a signal not with an ideal square wave but with a gentle potential gradient on the rising and falling edges is used. An input signal is preferably close to a sine wave, in which case electromagnetic noise can be further reduced. Examples of a method for generating such a waveform from a square wave include using a delay circuit or the like and adding a capacitor to a wiring. Preferably, such a waveform may be generated by decreasing the current supply capability of a signal generator circuit.

Figure 16A:
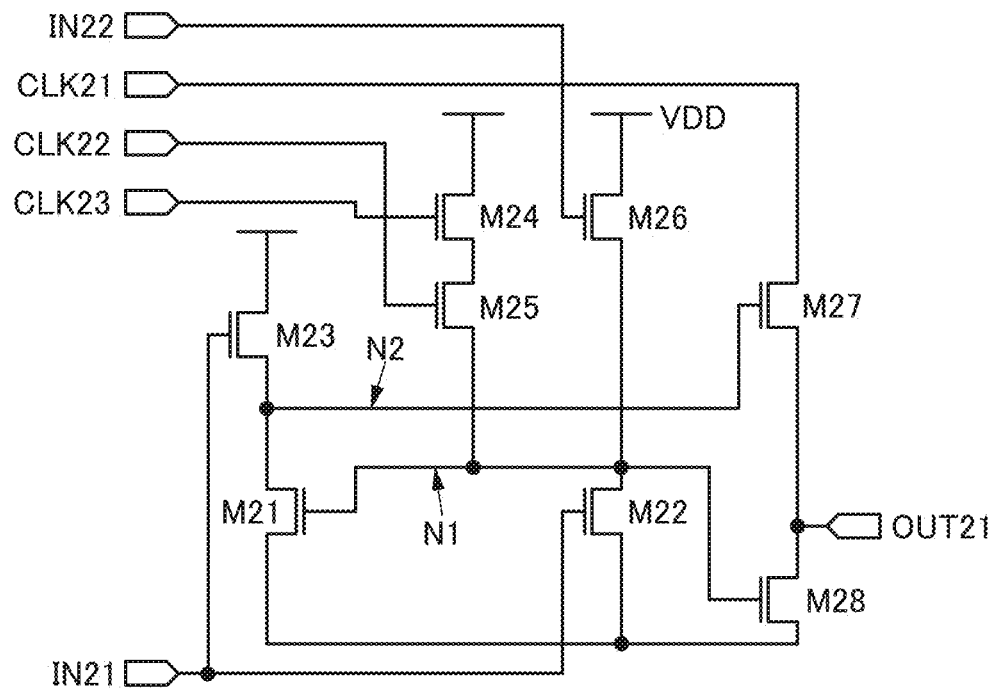
FIGS. 16A and 16B are a circuit diagram and a timing chart in Example 1.
Figure 16B:
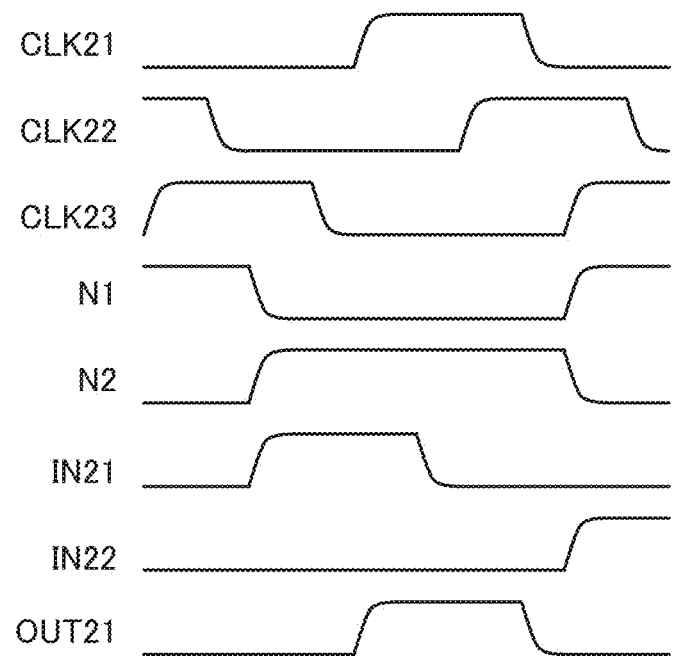

FIG. 16A illustrates a shift register circuit of one embodiment of the present invention. The circuit illustrated in FIG. 16A is a circuit extracted in part from the circuit in FIG. 9. Transistors M21 to M28 included in the circuit of FIG. 16A are preferably transistors in which the above-described oxide semiconductor is contained in a channel formation region. FIG. 16B is a timing chart. When the circuit in FIG. 16A is driven using input signals with waveforms shown in FIG. 16B, for example, generation of electromagnetic noise in the circuit can be prevented. The shift register circuit of one embodiment of the present invention has lower shoot-through current than a shift register circuit using a CMOS circuit described later, partly because it is composed of transistors with the same conductivity type. If a circuit with the same configuration is formed using transistors in which amorphous silicon, low-temperature polysilicon, or the like is used for a semiconductor layer, it is necessary to add a capacitor to a node N1 to prevent leakage current. As a result, current required for charging and discharging is increased, which may increase power consumption as compared to the case of using the oxide semiconductor.

Figure 17A:
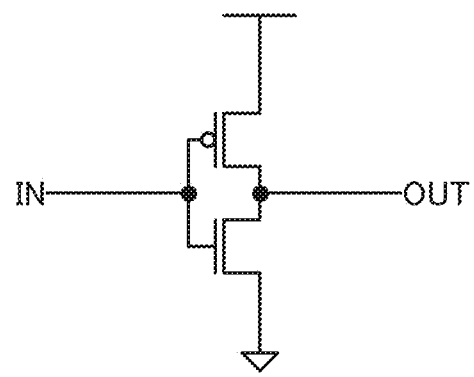
FIGS. 17A and 17B are circuit diagrams in Example 1.
Figure 17B:
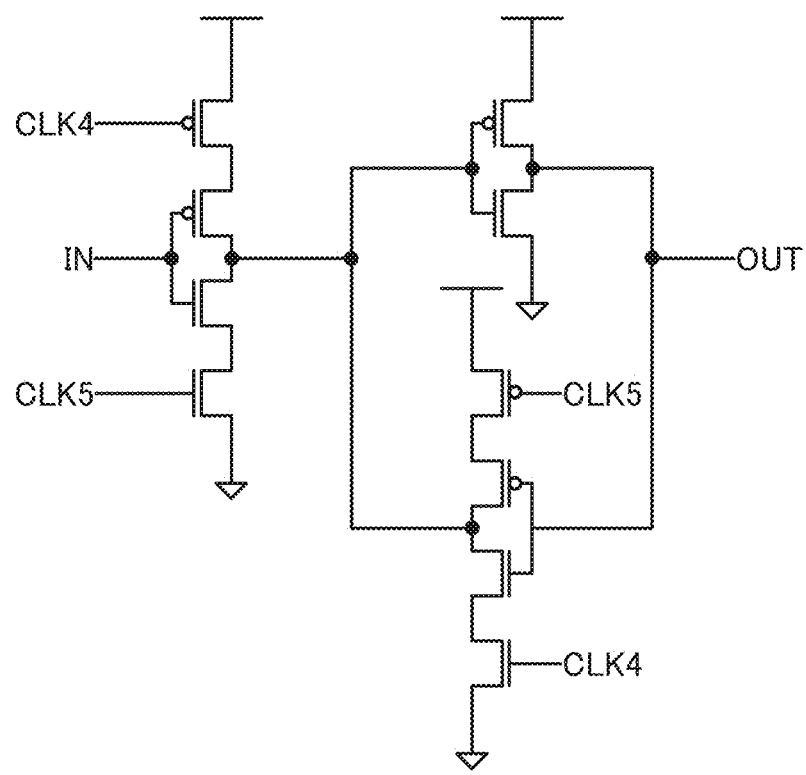

Here, the case where a CMOS circuit in which an n-channel transistor and a p-channel are combined as shown in FIG. 17A is used in a shift register circuit is considered. FIG. 17B illustrates an example of a shift register circuit (circuit B) using the CMOS circuit.

Figure 18A:
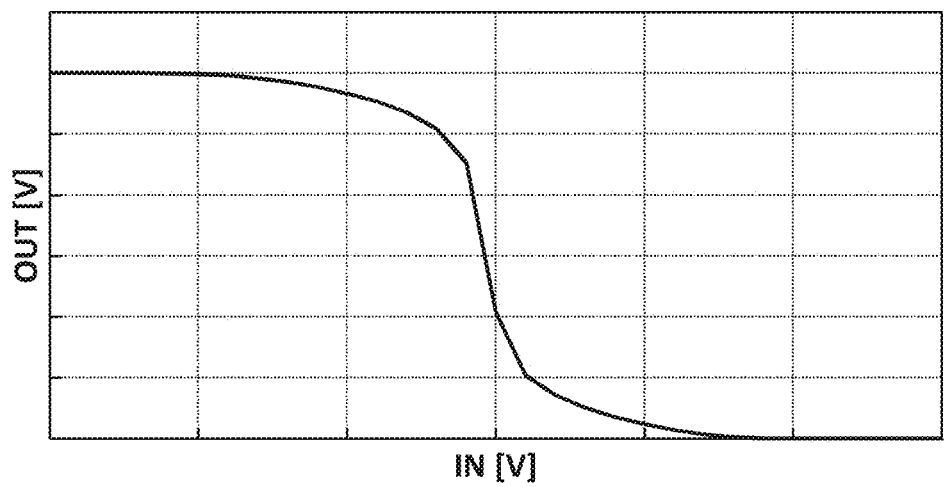
FIGS. 18A and 18B show input-output characteristics in Example 1.
Figure 18B:
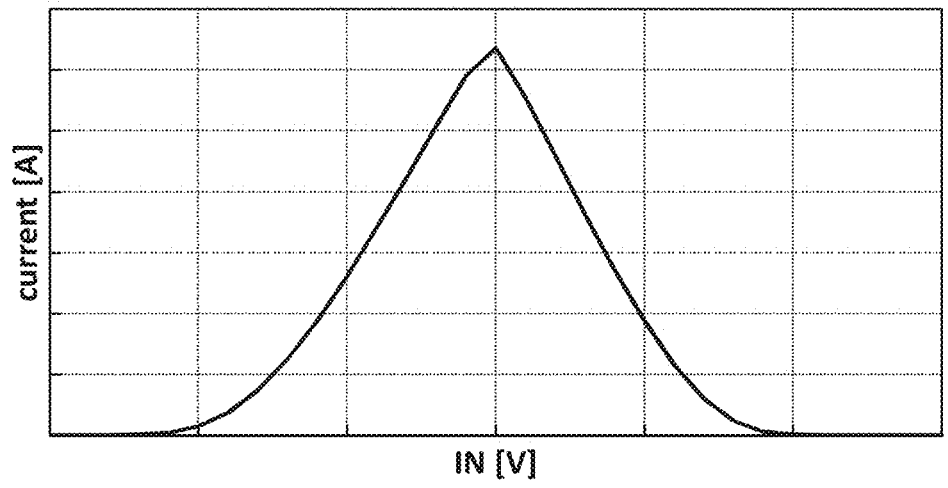

The assumption is made that each transistor in FIGS. 17A and 17B contains silicon such as low-temperature polysilicon in a semiconductor layer in which a channel is formed. FIG. 18A shows an example of input-output characteristics of the CMOS circuit in FIG. 17A. In the CMOS circuit having the transistor in which silicon is used for the semiconductor layer, as shown in FIG. 18B, a shoot-through current flows when input voltage is inverted. This means that when a signal not with an ideal square wave but with a gentle potential gradient on the rising and falling edges is used as an input signal, power consumption due to shoot-through current is further increased.

Power consumption (charge consumption) of the circuit A in FIG. 9 and that of the circuit B in FIG. 17B with varying rise time of an input signal were calculated for comparison. When a high-level potential at which the input signal is saturated is 100%, the rise time refers to time it takes for a potential level to increase from 10% to 90%.

Figure 19:
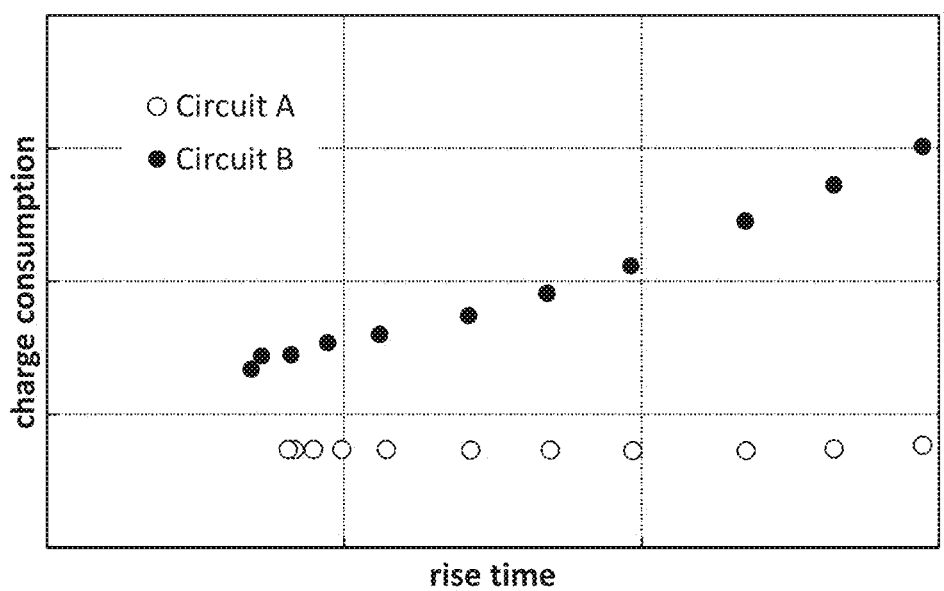
FIG. 19 shows results of calculating output characteristics of circuits in Example 1.

FIG. 19 shows the calculation results. In the circuit B, power consumption increases as the rise time of the input signal becomes longer. In contrast, in the circuit A, power consumption is almost constant regardless of the length of the rise time of the input signal.

A flexible display panel using the circuit illustrated in FIG. 9 as a gate driver was fabricated. The display panel was a top-emission organic EL panel using a color filter method. Transistors included in pixels and the driver circuit of the organic EL panel were formed using CAAC-OS for a semiconductor layer. The thickness of the display panel was approximately 50 μm.

Figure 20A:
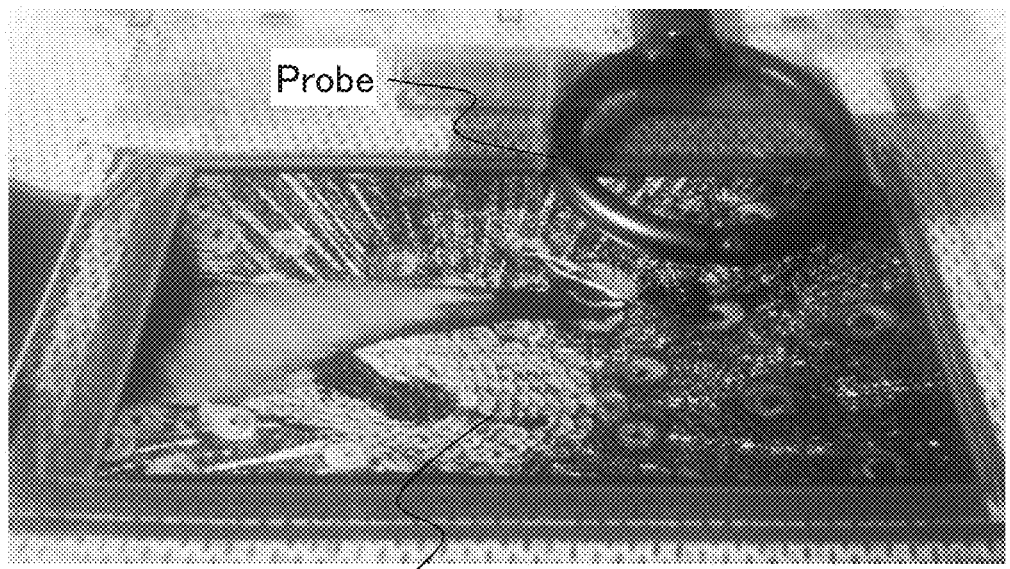
FIG. 20A is a photograph showing a display panel in measurement and FIG. 20B shows results of measuring electromagnetic noise in Example 1.

Electromagnetic noise emitted from the fabricated flexible display panel was measured by a spectrum analyzer while an image was displayed. FIG. 20A shows the panel at the time of measurement. The intensity of electromagnetic noise was measured with a spectrum analyzer probe placed directly above the gate driver. The measurement was performed under two conditions: when a signal input to the gate driver has a square wave and when the input signal has a waveform with gentle rising. For the latter condition, a capacitor was added to an input terminal of the display panel to increase the rise time of the signal from approximately 50 ns to approximately 800 ns. Although a capacitor is added in this example, addition of a resistor produces a similar effect; that is, source-sink current of a transistor for outputting a signal in an external control circuit for driving the organic EL panel can be reduced.

Figure 20B:
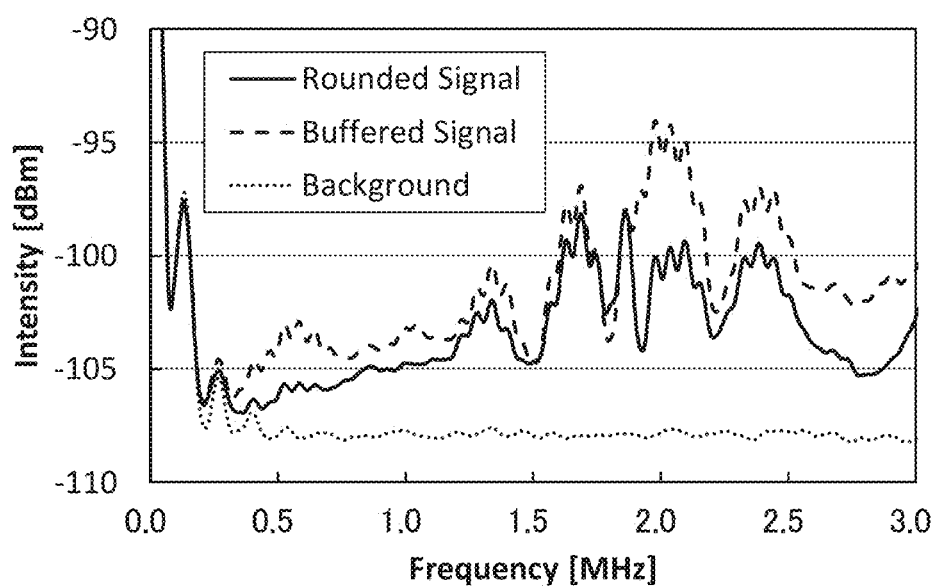

FIG. 20B shows the measurement results. As compared to the case of the input signal with a square wave (indicated by a dashed line), electromagnetic noise emitted from the display panel was reduced in the case where the input signal has a waveform with gentle rising (indicated by a solid line). Furthermore, a reduction of current flowing to VDD in FIG. 9 by approximately 20% was found.

At least part of this example can be implemented in combination with any of the embodiments described in this specification as appropriate.

Example 2

In this example, a change in resistance of a transparent conductive film that can be used in a touch panel and a touch sensor of one embodiment of the present invention was measured at the time of bending. Then, a touch sensor of one embodiment of the present invention was fabricated, and a change in its output signal between two states (when the touch sensor was bent and when it was not bent) was measured.

[Bending Test of Transparent Conductive Film]

Figure 21:
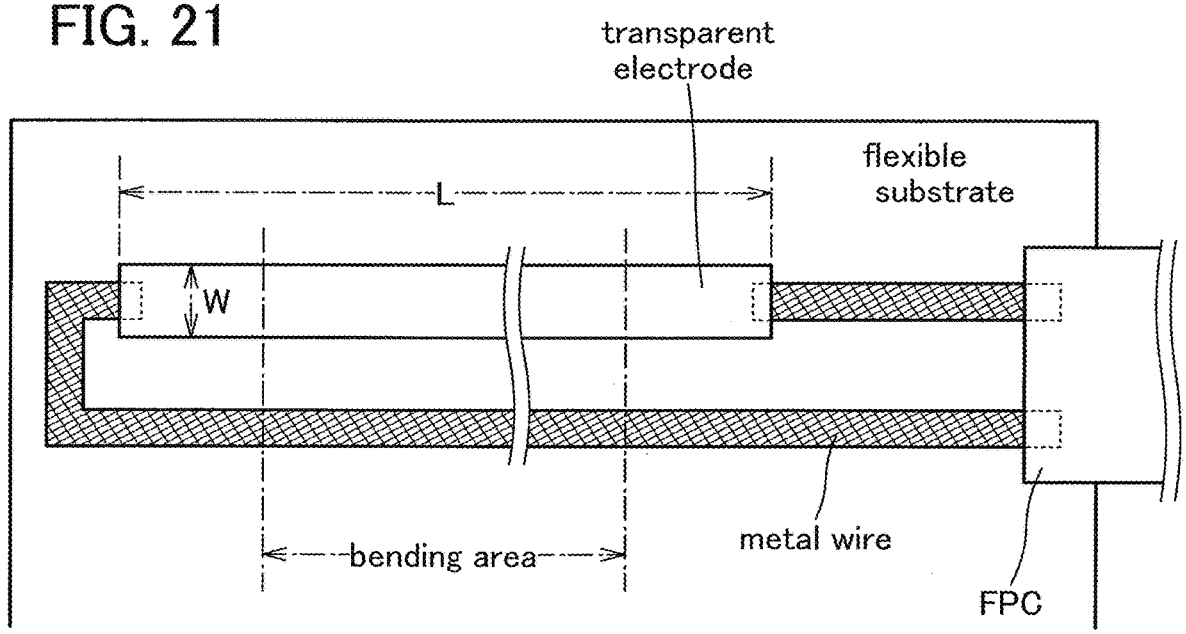
FIG. 21 is a schematic top diagram of a test element in Example 2.

FIG. 21 is a schematic top diagram of a test element fabricated to perform a bending test on the transparent conductive film. The test element includes, over a flexible substrate, two metal wirings and a transparent electrode electrically connected to the metal wirings. The metal wirings are electrically connected to respective ends of the transparent electrode and an FPC. The transparent electrode has a rectangular shape with a length L of 75 mm and a width W of 300 µm. As the transparent electrode, an indium tin oxide film containing silicon with a thickness of approximately 230 nm was used. As the metal wiring, a tungsten film with a thickness of approximately 200 nm was used.

The bending test was performed by bending the flexible substrate in a direction parallel to the longitudinal direction of the transparent electrode as shown in FIG. 21. The resistance of the test element was measured with a varying radius of curvature of the flexible substrate.

Figure 22:
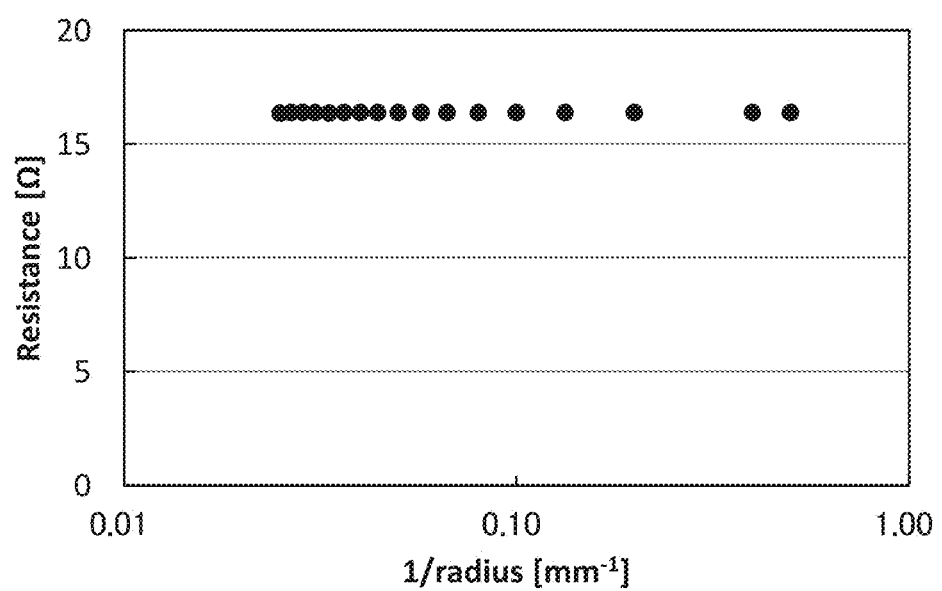
FIG. 22 shows results of measuring resistance in Example 2.

FIG. 22 shows the measurement results. The vertical axis and the horizontal axis of FIG. 22 represent the resistance and the inverse of the radius of curvature, respectively. FIG. 22 shows that the resistance does not change even when the radius of curvature is reduced. That is, the resistance of the transparent conductive film does not change even with a radius of curvature of 4 mm or less or approximately 2 mm. Accordingly, this transparent conductive film is suitably used in a flexible touch sensor, a flexible display panel, and a flexible touch panel.

[Bending Test of Touch Sensor]

A flexible touch sensor using the above transparent conductive film as a pair of electrodes was fabricated. The touch sensor was a mutual capacitive touch sensor. The thickness of the touch sensor was approximately 50 µm. The transmittance of the flexible touch sensor ranged from 80% to 85%.

Next, a signal output from the fabricated touch sensor was measured when the touch sensor was laid flat and when it was bent at 180° with a radius of curvature of 4 mm.

Figure 23A:
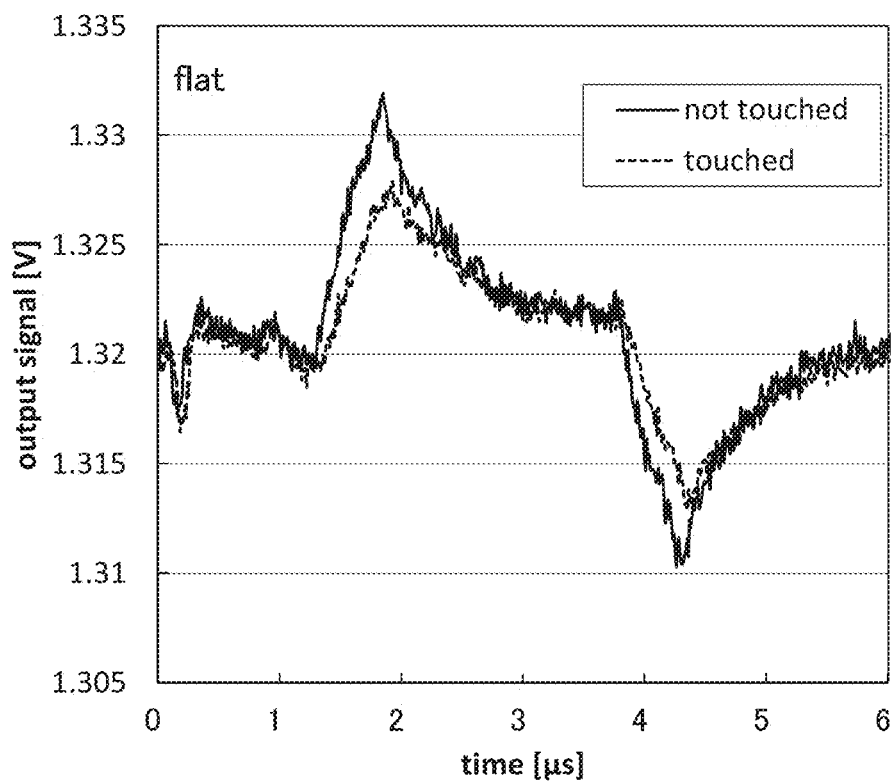
FIGS. 23A and 23B show output characteristics of a touch sensor in Example 2.
Figure 23B:
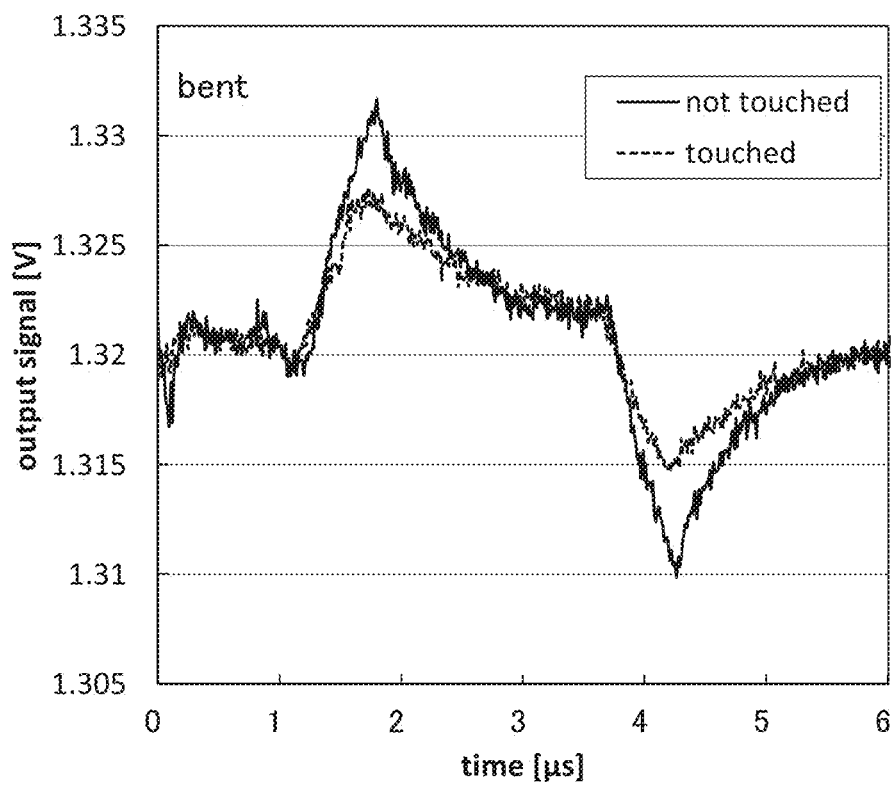

FIGS. 23A and 23B show the measurement results. Specifically, FIG. 23A shows the results measured when the touch sensor is laid flat, and FIG. 23B shows the results measured when the touch sensor is bent. In FIGS. 23A and 23B, a solid line indicates the results obtained when an object does not touch the touch sensor, and a dashed line indicates the results obtained when an object touches the touch sensor. The flat touch sensor and the bent touch sensor output substantially the same signals, and this fact demonstrates that the touch sensor can operate properly in either state.

At least part of this example can be implemented in combination with any of the embodiments described in this specification as appropriate.

Example 3

In this example, a touch panel was manufactured with the method for manufacturing a touch panel in one embodiment of the present invention.

Figure 14:
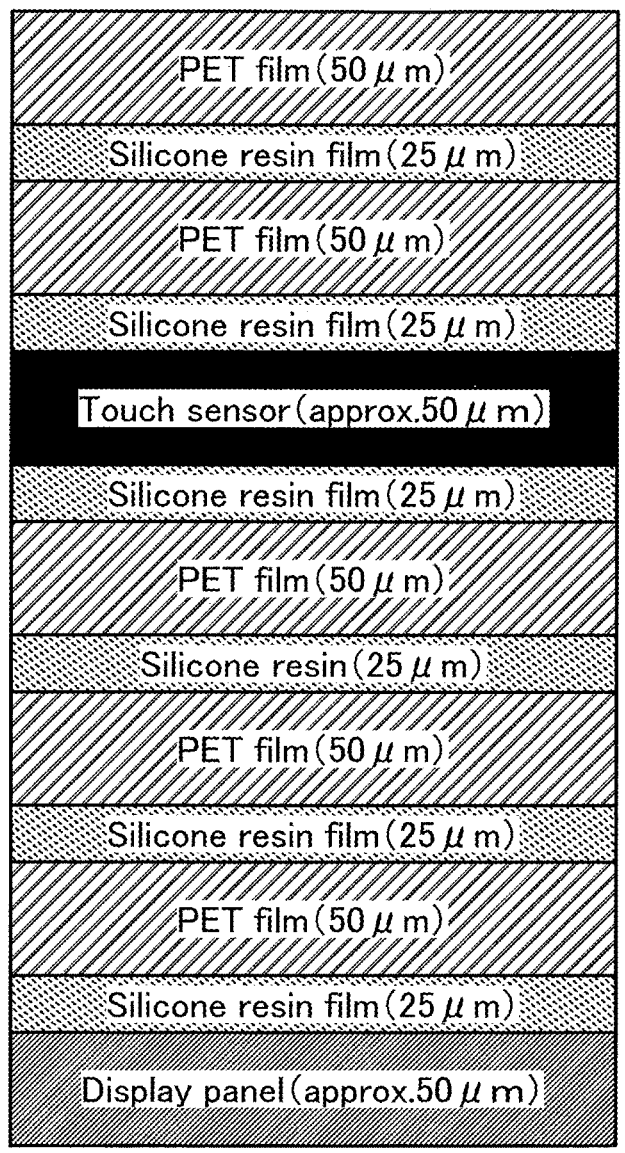
FIG. 14 illustrates a stacked-layer structure in Example 3.

The touch panel was manufactured with the manufacturing method example in Embodiment 1. FIG. 14 illustrates a stacked-layer structure of the fabricated touch panel. Here, the display panel was a top-emission organic EL panel using a color filter method. Transistors included in pixels and a driver circuit of the organic EL panel were formed using CAAC-OS for a semiconductor layer. The touch sensor was a mutual capacitive touch sensor. The display panel and the touch sensor each had a thickness of approximately 50 µm. The film layer was a PET film with a thickness of approximately 50 µm. The bonding layer was a silicone resin film with a thickness of approximately 25 µm.

As the support, an epoxy resin having curved opposite edges with a radius of curvature of 4 mm was used. According to the manufacturing method described in Embodiment 1, the touch panel was fabricated along the opposite side surfaces and the top surface of the support.

Figure 15:
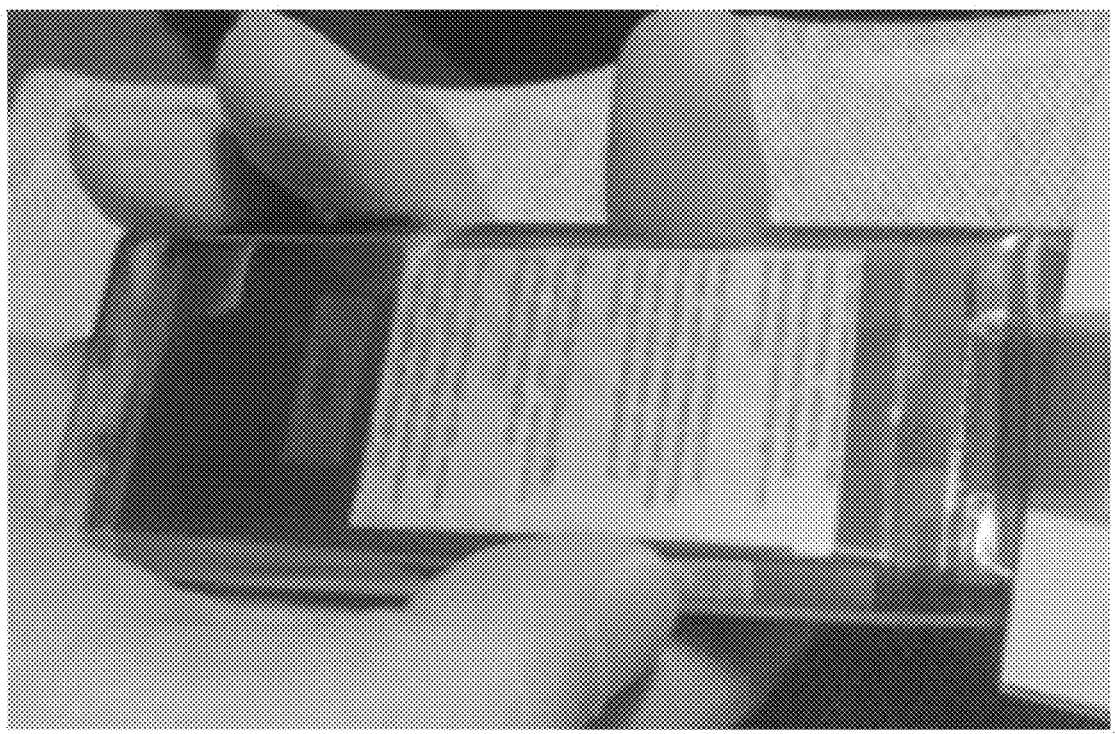
FIG. 15 is a photograph of a touch panel in Example 3.

FIG. 15 is a photograph of the fabricated touch panel. In the application shown in FIG. 15, text data is displayed on a region of the top surface of the support and can be scrolled up and down by operating a slider displayed on a region of the side surface of the support. It was demonstrated that multi-touch operation was achieved in the regions at the side surface and the top surface of the support. Providing the control portion at the side of the panel in this manner is convenient for one-handed holding and operation of a mobile device.

At least part of this example can be implemented in combination with any of the embodiments described in this specification as appropriate.

EXPLANATION OF REFERENCE

10: electronic device, 100: touch panel, 101: housing, 102: exterior component, 103: support, 111: display panel, 112: touch sensor, 113: film layer, 114: bonding layer, 201: substrate, 202: substrate, 205: FPC, 211: wiring, 212: wiring, 220: insulating layer, 221: electrode, 222: electrode, 223: wiring, 224: dielectric layer, 226: insulating layer, 231: bonding layer, 232: bonding layer, 235: protection layer, 255: connection layer, 330: portable information appliance, 333: display portion, 335: housing, 336: housing, 337: information, 339: operation button, 340: portable information appliance, 345: portable information appliance, 351: housing, 355: information, 356: information, 357: information, 358: display portion, 401: lower electrode, 402: EL layer, 403: upper electrodes, 405: insulating layer, 407: bonding layer, 420: substrate, 422: bonding layer, 424: insulating layer, 426: bonding layer, 428: substrate, 431: light-blocking layer, 432: coloring layer, 435: conductive layer, 450: organic EL element, 453: overcoat, 454: transistor, 455: transistor, 457: wiring, 463: insulating layer, 465: insulating layer, 467: insulating layer, 470: IC, 491: display portion, 493: driver circuit, 495: FPC, 496: insulating layer, 497: connector, 7100: portable information appliance, 7101: housing, 7102: display portion, 7103: band, 7104: buckle, 7105: operation button, 7106: input/output terminal, 7107: icon, 7200: lighting device, 7201: stage, 7202: light-emitting portion, 7203: operation switch, 7210: lighting device, 7212: light-emitting portion, 7220: lighting device, 7222: light-emitting portion, 7400: mobile phone, 7401: housing, 7402: display portion, 7403: operation button, 7404: external connection port, 7405: speaker, 7406: microphone This application is based on Japanese Patent Application serial no. 2013-249280 and no. 2014-104981 filed with Japan Patent Office on Dec. 2, 2013 and May 21, 2014, respectively, the entire contents of which are hereby incorporated by reference.

The invention claimed is:

1. An electronic device comprising:
a housing;
a display panel over the housing;
a first insulating film over the display panel;
a first bonding layer over the first insulating film;
a second insulating film over the first bonding layer;
a second bonding layer over the second insulating film;

a touch sensor over and in contact with the second bonding layer;
a third bonding layer over and in contact with the touch sensor;
a third insulating film over and in contact with the third bonding layer;
a fourth bonding layer over and in contact with the third insulating film; and
a fourth insulating film over and in contact with the fourth bonding layer,
wherein the display panel comprises a curved surface,
wherein the touch sensor and the curved surface of the display panel overlap each other,
wherein the third insulating film and the fourth insulating film comprise a same material, and
wherein the third bonding layer and the fourth bonding layer comprise a same material.

2. The electronic device according to claim 1,
wherein a thickness of the display panel is in a range of 1 µm to 300 µm,
wherein a thickness of the touch sensor is in a range of 1 µm to 300 µm, and
wherein a thickness of each of the first insulating film, the second insulating film, and the third insulating film is in a range of 1 µm to 300 µm.

3. The electronic device according to claim 1, wherein a thickness of each of the first bonding layer, the second bonding layer, and the third bonding layer is in a range of 300 nm to 300 µm.

4. The electronic device according to claim 1, wherein each of the first bonding layer, the second bonding layer, and the third bonding layer comprises a light-scattering material.

5. The electronic device according to claim 1, wherein the display panel comprises an organic EL element.

6. An electronic device comprising:
a housing;
a display panel over the housing, the display panel comprising a flexible substrate, a display element, and a transistor electrically connected to the display element;
a first insulating film over the display panel;
a first bonding layer over the first insulating film;
a second insulating film over the first layer;
a second bonding layer over the second insulating film;
a touch sensor over and in contact with the second bonding layer;
a third bonding layer over and in contact with the touch sensor;
a third insulating film over and in contact with the third bonding layer;
a fourth bonding layer over and in contact with the third insulating film; and
a fourth insulating film over and in contact with the fourth bonding layer,
wherein the display panel comprises a curved surface,
wherein the touch sensor and the curved surface of the display panel overlap each other,
wherein the third insulating film and the fourth insulating film comprise a same material, and
wherein the third bonding layer and the fourth bonding layer comprise a same material.

7. The electronic device according to claim 6,
wherein a thickness of the display panel is in a range of 1 µm to 300 µm,
wherein a thickness of the touch sensor is in a range of 1 µm to 300 µm, and
wherein a thickness of each of the first insulating film, the second insulating film, and the third insulating film is in a range of 1 µm to 300 µm.

8. The electronic device according to claim 6, wherein a thickness of each of the first bonding layer, the second bonding layer, and the third bonding layer is in a range of 300 nm to 300 µm.

9. The electronic device according to claim 6, wherein each of the first bonding layer, the second bonding layer, and the third bonding layer comprises a light-scattering material.

10. The electronic device according to claim 6, wherein the display element is an organic EL element.

11. An electronic device comprising:
a housing;
a display panel over the housing, the display panel comprising a flexible substrate, a display element, and a transistor electrically connected to the display element;
a first insulating film over the display panel;
a first bonding layer over the first insulating film;
a second insulating film over the first bonding layer;
a second bonding layer over the second insulating film;
a touch sensor over and in contact with the second bonding layer;
a third bonding layer over and in contact with the touch sensor;
a third insulating film over and in contact with the third bonding layer;
a fourth bonding layer over and in contact with the third insulating film; and
a fourth insulating film over and in contact with the fourth bonding layer,
wherein the display panel comprises a plurality of curved regions,
wherein the touch sensor and the plurality of curved regions of the display panel overlap each other,
wherein the third insulating film and the fourth insulating film comprise a same material, and
wherein the third bonding layer and the fourth bonding layer comprise a same material.

12. The electronic device according to claim 11,
wherein a thickness of the display panel is in a range of 1 µm to 300 µm,
wherein a thickness of the touch sensor is in a range of 1 µm to 300 µm, and
wherein a thickness of each of the first insulating film, the second insulating film, and the third insulating film is in a range of 1 µm to 300 µm.

13. The electronic device according to claim 11, wherein a thickness of each of the first bonding layer, the second bonding layer, and the third bonding layer is in a range of 300 nm to 300 µm.

14. The electronic device according to claim 11, wherein each of the first bonding layer, the second bonding layer, and the third bonding layer comprises a light-scattering material.

15. The electronic device according to claim 13, wherein the display element is an organic EL element.

* * * * *